United States Patent
Itabashi

(10) Patent No.: US 7,826,116 B2
(45) Date of Patent: Nov. 2, 2010

(54) OPTICAL SCANNING DEVICE AND IMAGE FORMING APPARATUS

(75) Inventor: Akihisa Itabashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 827 days.

(21) Appl. No.: 11/710,957

(22) Filed: Feb. 27, 2007

(65) Prior Publication Data
US 2007/0206256 A1 Sep. 6, 2007

(30) Foreign Application Priority Data

Mar. 3, 2006 (JP) ............................. 2006-057208
Mar. 3, 2006 (JP) ............................. 2006-057215

(51) Int. Cl.
*G02B 26/08* (2006.01)

(52) U.S. Cl. ................................ 359/205.1; 359/204.1

(58) Field of Classification Search .... 359/196.1–226.2
See application file for complete search history.

(56) References Cited

U.S. PATENT DOCUMENTS

| | | |
|---|---|---|
| 6,429,956 B2 | 8/2002 | Itabashi |
| 6,596,985 B2 | 7/2003 | Sakai et al. |
| 6,624,920 B2 | 9/2003 | Itabashi |
| 6,707,480 B2 | 3/2004 | Ameyama et al. |
| 6,747,818 B2 | 6/2004 | Ohashi et al. |
| 6,771,407 B2 | 8/2004 | Hayashi et al. |
| 6,791,596 B2 | 9/2004 | Nihei et al. |
| 6,839,157 B2 | 1/2005 | Ono et al. |
| 6,932,271 B2 | 8/2005 | Nakajima et al. |
| 7,006,271 B2 | 2/2006 | Ono et al. |
| 7,050,080 B2 | 5/2006 | Ema et al. |
| 7,075,563 B2 | 7/2006 | Itabashi |
| 2005/0024479 A1 | 2/2005 | Itabashi et al. |
| 2005/0046916 A1* | 3/2005 | Shimomura ................. 359/205 |
| 2005/0105156 A1 | 5/2005 | Ono et al. |
| 2005/0179971 A1 | 8/2005 | Amada et al. |
| 2006/0132880 A1* | 6/2006 | Amada et al. ................ 359/196 |

FOREIGN PATENT DOCUMENTS

| | | |
|---|---|---|
| JP | 63-043172 | 2/1988 |
| JP | 09-058053 | 3/1997 |
| JP | 11-142767 | 5/1999 |
| JP | 2000-241733 | 9/2000 |
| JP | 2001-253113 | 9/2001 |
| JP | 2002-148551 | 5/2002 |
| JP | 2002-258189 | 9/2002 |

(Continued)

*Primary Examiner*—James Phan
(74) *Attorney, Agent, or Firm*—Harness, Dickey & Pierce, P.L.C.

(57) ABSTRACT

An optical scanning device includes a light source, a deflector, and an optical system including an elongated optical element that focuses deflected luminous flux on a surface of a medium to be scanned. The optical element is supported by a first elastic member and reinforced by a reinforcing member arranged outside a beam effective range along a length of the optical element. The optical element is pressed by a pressing member in a pressing direction orthogonal to a deflection direction, and biased by a second elastic member in a direction opposite to the pressing direction. The pressing member and the second elastic member control a posture of the optical element at a substantially central part in a main scanning direction.

6 Claims, 14 Drawing Sheets

FOREIGN PATENT DOCUMENTS

| | | |
|---|---|---|
| JP | 2003-154703 | 5/2003 |
| JP | 2003-215484 | 7/2003 |
| JP | 2003-233094 | 8/2003 |
| JP | 2004-287380 | 10/2004 |
| JP | 2005-062258 | 3/2005 |

* cited by examiner

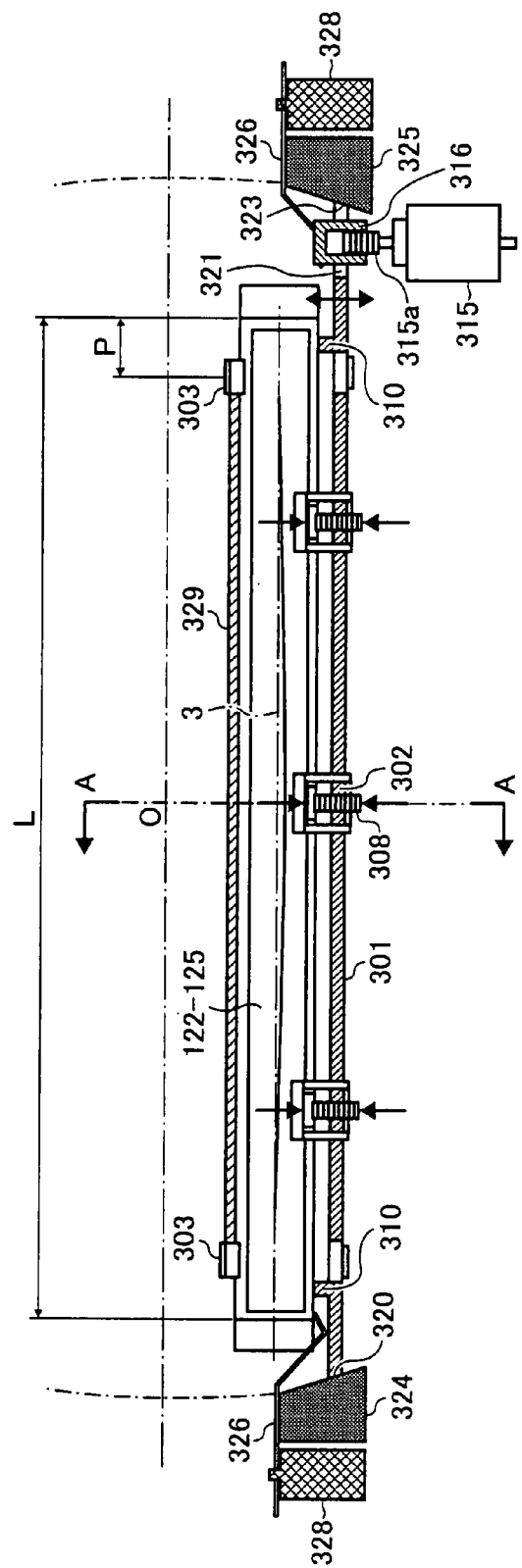
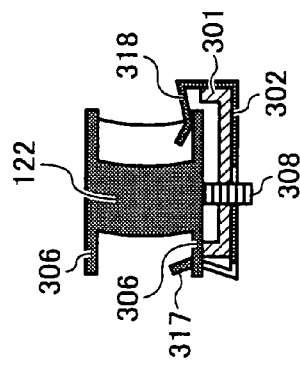

OPTICAL SCANNING DEVICE AND IMAGE FORMING APPARATUS

CROSS-REFERENCE TO RELATED APPLICATIONS

The present document incorporates by reference the entire contents of Japanese priority document, 2006-057215 filed in Japan on Mar. 3, 2006, and 2006-057208 filed in Japan on Mar. 3, 2006.

BACKGROUND OF THE INVENTION

1. Field of the Invention

The present invention relates to a technology for scanning a medium using an optical scanning device.

2. Description of the Related Art

In recent years, a scanning optical system is used in image forming apparatuses. The scanning optical system exposes a photosensitive element with a beam emitted from a semiconductor laser. In an embodiment of the present invention, the configuration of an optical scanning device that does not degrade the quality of output images is explained. More specifically, the degradation is caused by individual variability of optical components that form the optical system including a plurality of scanning/exposing units, and caused by changes in their environment.

The optical scanning device forms a beam spot on a surface to be scanned by deflecting light beams from a light source by a rotating polygon mirror and focusing the deflected light beams toward the surface using a scanning and imaging optical system that includes an fθ lens, to scan the surface with the formed beam spot. The optical scanning device configured in this manner is widely known related to image forming apparatuses such as optical printers, optical plotters, and digital copiers.

The image forming apparatus using the optical scanning device employs an image writing process, as one process in an image forming process, for writing an image by optical scanning. The quality of the image formed in the image forming process depends on the quality of the optical scanning in the image writing process. The quality of the optical scanning depends on scanning characteristics in a main scanning direction and a sub-scanning direction of the optical scanning device.

One of the scanning characteristics in the main scanning direction is constant-speed scanning performance. For example, when a rotating polygon mirror is used as a light deflector, the light beams are deflected at a constant angular velocity. Therefore, to realize the constant-speed scanning performance, a scanning and imaging optical system in which an fθ characteristic is corrected is used.

However, it is not easy to precisely correct the fθ characteristic due to other performances required of the scanning and imaging optical system. Therefore, optical scanning by an actual scanning optical system is not performed at a constant speed and the constant speed performance as the scanning characteristic deviates from ideal constant speed scanning.

The scanning characteristic in the sub-scanning direction includes bending of the scanning line (hereinafter, "scanning line bending") or a tilt of the scanning line. The scanning line is the path traversed by the beam spot on the surface to be scanned, and a straight line is ideal. Therefore, the optical scanning device is designed so that the scanning line is made to be a straight line. However, bending occurs in the scanning line caused by a machining error or an assembly error of optical elements and machine components.

When an imaging mirror is used as the scanning and imaging optical system and an angle is formed in the sub-scanning direction between an incidence direction of a deflected light beams into the imaging mirror and its reflection direction, bending occurs in a scanning line in principle. Even when the scanning and imaging optical system is configured as a lens system, the scanning line bending also inevitably occurs in a multibeam scanning system for optically scanning the surface with a plurality of beam spots that separate from one another in the sub-scanning direction.

The tilt of the scanning line is such that the scanning line is not orthogonal to the sub-scanning direction, which is one of scanning line bending. Therefore, in the following, explanation is given in such a manner that the tilt of the scanning line is included in an expression such as the scanning line bending, unless otherwise specified.

When an image is a monochrome image, which is written and formed by a single optical scanning device, and if scanning line bending and imperfect-constant speed performance (displacement from ideal constant speed scanning) are suppressed to some extent, visually recognized deformation does not occur in the formed image. Even so, it is desirable to reduce distortion of the image.

In addition to the monochrome image, there is a three-color image including magenta, cyan, and yellow, or a four-color image including black added to the three colors. The three-color image or the four-color image is formed as color-component images and these color-component images are superposed on each other to form a color image. This system of forming the color image is conventionally used in color copiers.

One of systems of forming a color image in the above manner is a tandem-type image forming system, which forms images for the respective color components on photosensitive elements for the respective color components. In this image forming system, if there is a variation in mutual scanning positions of optical scanning devices with respect to photosensitive elements or there is a difference in bending and a tilt of scanning lines, an abnormal image called color misregistration appears in the formed color image, which causes the quality of the color image to be degraded.

Japanese Patent Application Laid-Open No. 2002-258189 discloses an optical scanning device, as a unit of reducing bending or a tilt of the scanning line, which corrects the bending or the tilt of the scanning line by bending a long lens at a plurality of supports as support points or by tilting the long lens in the sub-scanning direction.

As a method of reinforcing an optical element, Japanese Patent Application Laid-Open No. H11-142767 discloses an example that a reinforcing plate made of a glass plate is adhered to the rear face of a mirror with a damping material, while Japanese Patent Application Laid-Open No. 2000-241733 discloses an example that a plate glass is bonded to the side face of a lens.

In an image forming apparatus using a Carlson process, a latent image formation, development, and transfer are sequentially performed according to a rotation of a photosensitive drum.

In a multi-color image forming apparatus, in which a plurality of photosensitive drums are arranged along a conveying direction of a transfer element and toner images formed on image forming stations for respective colors are superposed one another to create a multi-color image, color misregistration or color change occurs due to misregistration of the toner images in the sub-scanning direction and image quality is deteriorated. The misregistration occurs while forming a latent image and transferring the latent image. More specifically, the misregistration is caused by different spaces between the photosensitive drums for the respective colors due to eccentricity of or a variation in a diameter of each photosensitive drum, or caused by speed fluctuation or meandering of a transfer element such as a transfer belt or a conveyor belt for conveying recording paper.

Similarly, in the optical scanning device, if main-scanning magnifications and writing positions of electrostatic latent images formed on the respective photosensitive drums are not accurate with each other, the mismatches cause misregistration, which leads to color misregistration and color change.

Conventionally, the misregistration is not specified whether it is caused by the optical scanning device or caused by anything else other than the optical scanning device. Technologies for preventing the misregistration are disclosed in Japanese Patent Application Kokoku No. H07-19084 and Japanese Patent Applications Laid-Open Nos. 2001-253113 and 2003-154703. In the technologies, the misregistration is periodically detected using a misregistration detection pattern recorded on a transfer element upon startup of the device or between jobs, the position of a first line in the sub-scanning direction is corrected by matching write-start timing on every one facet of a polygon mirror which is a light deflector, and a write-start position in the main scanning direction is corrected by adjusting a timing from a synchronization detection signal generated at a scanning start point.

Furthermore, as described in Japanese Patent Application Laid-Open No. H09-58053, the magnifications of the full width between colors are made coincident with each other by detecting a scanning time from a scanning start point to a scanning end point, and by tuning frequencies of pixel clocks to each other.

On the other hand, in the multi-color image forming apparatus, an operation speed is increasing and a density of an image to be created is rising. As measures against this, there is a method of increasing the rotational speed of the polygon mirror. However, a bearing life is limited, so that heat generation and vibration cannot be suppressed. Therefore, a system using a multibeam light source capable of realizing increased speed and increased density is proposed. The increased speed and increased density can be realized by simultaneously scanning a plurality of beams at a lower rotational speed.

However, for the multibeam light source, there are a pitch error and a difference in wavelength between light sources. Japanese Patent Application Laid-Open No. 2003-154703 discloses a technology for avoiding displacement between the light sources by individually detecting misregistration of a plurality of lines as a set.

Furthermore, Japanese Patent Application Laid-Open Nos. 2003-233094 and 2003-215484 disclose technologies for using a liquid-crystal deflecting element as a unit of correcting a scanning position in the sub-scanning direction.

Moreover, Japanese Patent Application Laid-Open No. 2002-148551 discloses configurations of an optical scanning device for a multi-color image forming apparatus as an example. One of the configurations is such that light beams from light sources for respective colors are collectively scanned by a single polygon mirror, and a plurality of return mirrors are integrally supported in a shared optical housing to guide the light beams to corresponding scanning optical systems and photosensitive drums. Alternatively, the other one of the configurations is such that optical scanning devices are individually arranged in association with the respective photosensitive drums.

In the multi-color image forming apparatus configured in the above manner, components are arranged so that light beams toward the photosensitive drums pass through different paths. Therefore, scanning positions of the light beams easily fluctuate due to environmental factors such as ambient temperature where the multi-color image forming apparatus is placed.

A displacement between scanning positions is periodically detected and corrected using a misregistration detection pattern recorded on a transfer element upon startup of the device or between jobs. However, as explained above, a radiating position further fluctuates due to heat produced by a fixing device and a polygon mirror during printing operation. Thus, if there are a large number of sheets to be printed for one job, color misregistration and color change occur little by little.

Particularly, as described in Japanese Patent Application Laid-Open No. 2002-148551, when the optical systems are arranged to face each other across a polygon mirror, the scanning directions are opposite to each other. Therefore, the write-start position is displaced due to fluctuation of the main-scanning magnification, and besides that, scanning positions between colors are displaced in their increasing direction due to distortion of an optical housing. Accordingly, color misregistration and color change easily occur.

As measures against the problems, when the temperature is always observed and the change in temperature reaches a predetermined value or when the number of prints exceeds a predetermined number, the printing operation is interrupted, and a displacement between the radiating positions is corrected again. However, the processes such that the misregistration detection pattern is created and corrected or that the detection pattern is again created and corrected take several minutes until the operation is finished. Accordingly, productivity is deteriorated. In addition, toner is wastefully consumed because of creation of the detection pattern, and thus, the frequency of correction is desirably suppressed to a minimum.

Recently, to achieve improved scanning characteristics, it has become common to use a specific surface such as an aspheric surface for the imaging optical system of the optical scanning device. Such an imaging optical system is used in many cases because the specific surface can easily be formed and a low-cost resin material can be used to manufacture the imaging optical system.

In the imaging optical system made of the resin material, the optical characteristics are affected and easily changed by changes in temperature and humidity. The changes of the optical characteristics cause the scanning line bending and constant speed performance to be changed. Therefore, when tens of color images are continuously formed, the internal temperature increases due to continuous operation of the image forming apparatus. With this increase, the temperature in an optical writing device increases, and positional precision of a receiving surface of an optical element in the optical housing is degraded. Accordingly, a failure occurs such that a scanning position on the photosensitive element is displaced over time due to changes in the beam position with respect to the optical element and changes in an angle at which the return mirror is provided.

As a result, the optical characteristics of the imaging optical system change, the degree of write scanning line bending of the optical writing device and the constant speed performance gradually change, and color misregistration occurs caused by the displacement between the scanning positions. This leads to completely different color shades between a color image obtained at the beginning of image formation and a color image obtained at the end of the image formation.

A scanning and imaging lens such as an fθ lens, which is a typical scanning optical system, is generally formed as a strip-shaped lens with a long side in the main scanning direction, by cutting off an unnecessary portion (portion into which deflected light beams are not made incident) in the sub-scanning direction.

If the scanning and imaging lens is formed with a plurality of lenses, a long lens is needed. The long lens is such that the lens length in the main scanning direction increases as an arrangement position thereof is farther away from the light deflector. The long lens has a length of about 100 millimeters to 250 millimeters or more. This type of long lens is formed by resin molding using resin material. If temperature distribution in the lens becomes nonuniform due to changes in ambient temperature, a warp occurs, and the lens can be distorted to become a curved shape in the sub-scanning direction. The warp of the long lens in the above manner causes the scanning line bending.

Japanese Patent Application Laid-Open No. 2004-287380 discloses a correcting unit for correcting the scanning line bending due to the warp of the long lens. The correcting unit corrects the bending by pressing the long lens from both sides of the long lens in the sub-scanning direction and adjusting the amount of press force. In the example, a pressing unit is arranged in three locations in the longitudinal direction of the long lens, and a cylindrical pressing element forming the pressing unit is pressed against the long lens, to adjust (correct) the scanning line bending of the long lens.

Japanese Patent Application Laid-Open No. 2005-62258 discloses a unit that selects or moves a pressing position of a curvature adjusting screw provided in the long lens according to the characteristics of the lens, and that presses an inflection point of the curvature to correct the curvature.

In the adjusting (correcting) units, however, the curvature is adjusted by pressing the adjustment position at a pin point. Therefore, the curved position fluctuates due to changes in use environment, or the curved shape is changed to a high-order shape due to the adjustment. Accordingly, the curvature cannot be precisely corrected.

Japanese Patent Application Laid-Open No. 2000-241733 discloses a method of providing anti-vibration by bonding a plate glass to the side face of the long lens along the scanning direction. The method allows improved rigidity of the long lens, and therefore, it is possible to reduce deformation of the lens due to external stress. However, it is difficult to resolve the warp of the lens due to changes in temperature.

SUMMARY OF THE INVENTION

It is an object of the present invention to at least partially solve the problems in the conventional technology.

According to an aspect of the present invention, an optical scanning device that scans a surface of a medium in a main scanning direction includes a light source that emits a luminous flux; a deflector that deflects the luminous flux emitted by the light source in a deflection direction toward the surface of the medium; an optical system that includes an elongated optical element that focuses the luminous flux deflected by the deflector on the surface of the medium, the elongated optical element being arranged substantially parallel to the main scanning direction; a first elastic member that supports an end of the optical element; a reinforcing member that reinforces the optical element and is arranged outside a beam effective range and along a length of the optical element; a pressing member that presses the optical element in a pressing direction that is orthogonal to the deflection direction; and a second elastic member that biases the optical element in a direction opposite to the pressing direction, wherein the pressing member and the second elastic member control a posture of the optical element at a substantially central part in the main scanning direction.

According to another aspect of the present invention, an optical scanning device that scans a surface of a medium in a main scanning direction includes a light source that emits a luminous flux; a deflector that deflects the luminous flux emitted by the light source in a deflection direction toward the surface of the medium; an optical system that includes an elongated optical element that focuses the luminous flux deflected by the deflector on the surface of the medium, the elongated optical element being arranged substantially parallel to the main scanning direction; a pressing member that presses and holds the optical element at n locations, where n is equal to or greater than 1, in a pressing direction orthogonal to the deflection direction; and an elastic member that biases the optical element in a direction opposite to the pressing direction, wherein the pressing member and the elastic member control a posture of the optical element, and the pressing member satisfies K<S<L/n, where S is a length of the pressing member along the main scanning direction, K is a length of the elastic member along the main scanning direction, and L is a length of the optical element along the main scanning direction.

According to still another aspect of the present invention, an image forming apparatus includes at least one image carrier that forms a monochrome latent image; and an optical scanning device that includes an optical system corresponding to the image carrier and optically scans the image carrier to form the monochrome latent image, wherein the optical scanning device includes a light source that emits a luminous flux, a deflector that deflects the luminous flux emitted by the light source in a deflection direction toward a surface of an medium to be scanned, wherein the optical system that includes an elongated optical element that focuses the luminous flux deflected by the deflector on the surface of the medium, the elongated optical element being arranged substantially parallel to the main scanning direction; a first elastic member that supports an end of the optical element; a reinforcing member that reinforces the optical element and is arranged outside a beam effective range and along a length of the optical element; a pressing member that presses the optical element in a pressing direction that is orthogonal to the deflection direction; and a second elastic member that biases the optical element in a direction opposite to the pressing direction, wherein the pressing member and the second elastic member control a posture of the optical element at a substantially central part in the main scanning direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5A is a front view of the support structure of an assembled anamorphic lens shown in FIG. 4;

FIG. 5B is a side view taken along line A-A of FIG. 5A;

DETAILED DESCRIPTION OF THE PREFERRED EMBODIMENTS

Exemplary embodiments of the present invention are explained in detail below with reference to the accompanying drawings.

Figure 1:
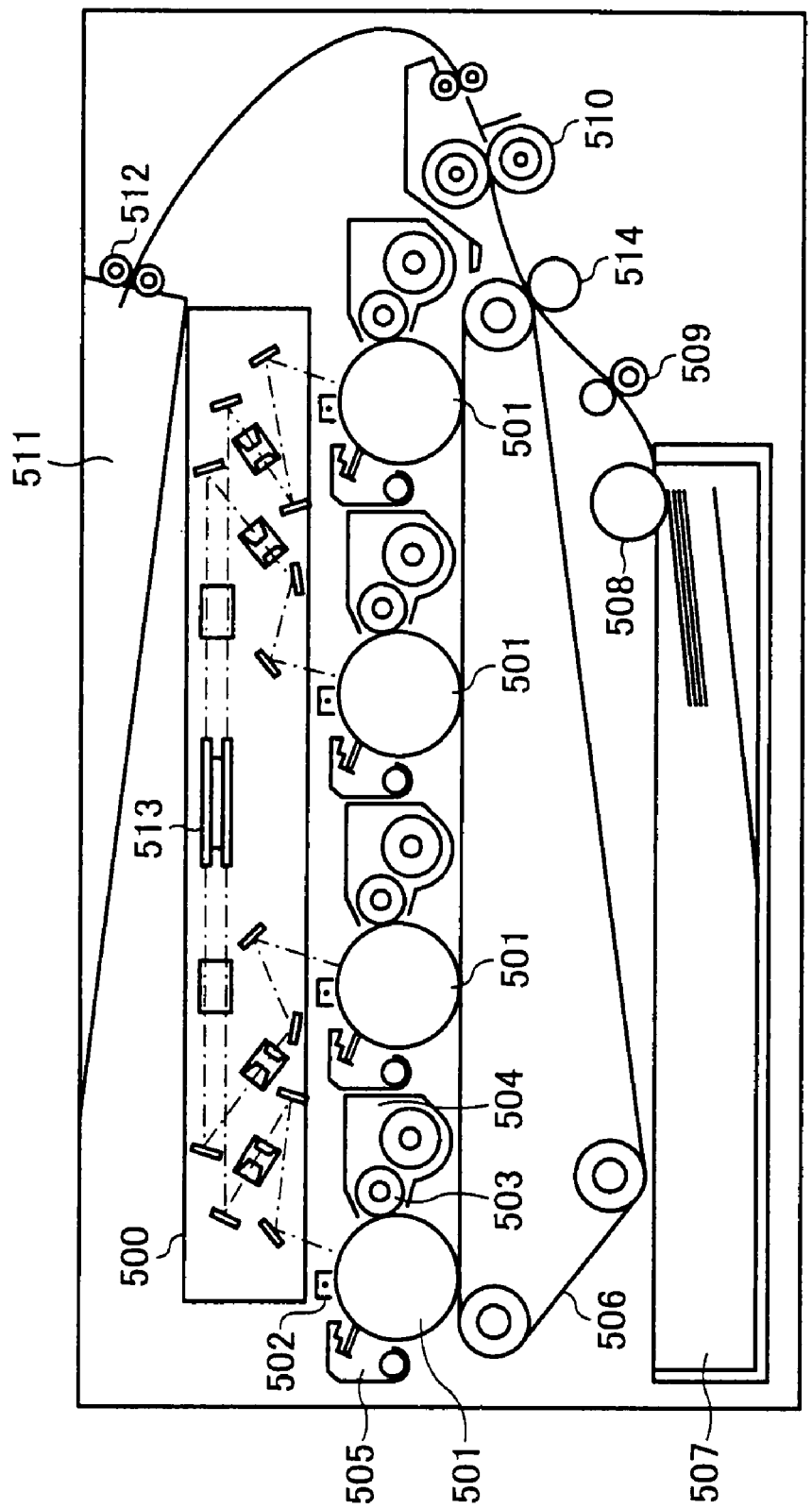
FIG. 1 is a side view of an image forming apparatus according to a first embodiment of the present invention.

FIG. 1 is a side view of an image forming apparatus according to a first embodiment of the present invention. The image forming apparatus includes an optical scanning device according to the first embodiment.

As shown in FIG. 1, components are arranged around each of four photosensitive drums 501. The components are a charging charger 502 that uniformly charges the photosensitive drum 501, a developing roller 503 that transfers charged toner to an electrostatic latent image formed through optical scanning by an optical scanning device 500 and visualizes the latent image, a toner cartridge 504 that supplies toner to the developing roller 503, and a cleaning unit 505 that scrapes and collects toner remaining on the photosensitive drum 501.

As shown in FIG. 1, the optical scanning device 500 scans a plurality of lines, for example, two lines using each facet of a polygon mirror 513 to simultaneously form latent images on the respective photosensitive drums 501.

Image forming stations including the four photosensitive drums 501 are arranged in a line in the direction of movement of a transfer belt 506 (counterclockwise in the drawing), toner images of yellow, magenta, cyan, and black are sequentially transferred to the transfer belt 506 at an appropriate timing, and are superposed one another to form a color toner image. The image forming stations have basically the same configuration as one another except different toner colors.

On the other hand, recording paper is supplied from a paper feed tray 507 by a paper feed roller 508, and is fed to a transfer unit 514 of the transfer belt 506 by a registration roller 509 at a timing at which recording in the sub-scanning direction is started, and a toner color image is transferred to the recording paper from the transfer belt 506. After the transfer, the toner color image on the recording paper is fixed by fixing rollers 510, and the recording paper is discharged to a paper discharge tray 511 by paper discharge rollers 512.

In the explanation of the image forming apparatus according to the first embodiment, the optical scanning device is configured to integrally form the stations for the respective colors into one unit. However, the optical scanning device can be configured as separate units corresponding to the stations, or can be configured as two units.

The optical scanning device 500 configured in the above manner enables an image to be formed at a speed four times as fast as that of the image forming apparatus having only one photosensitive element, that is, of the image forming apparatus that requires writing four times corresponding to the four colors.

Figure 2:
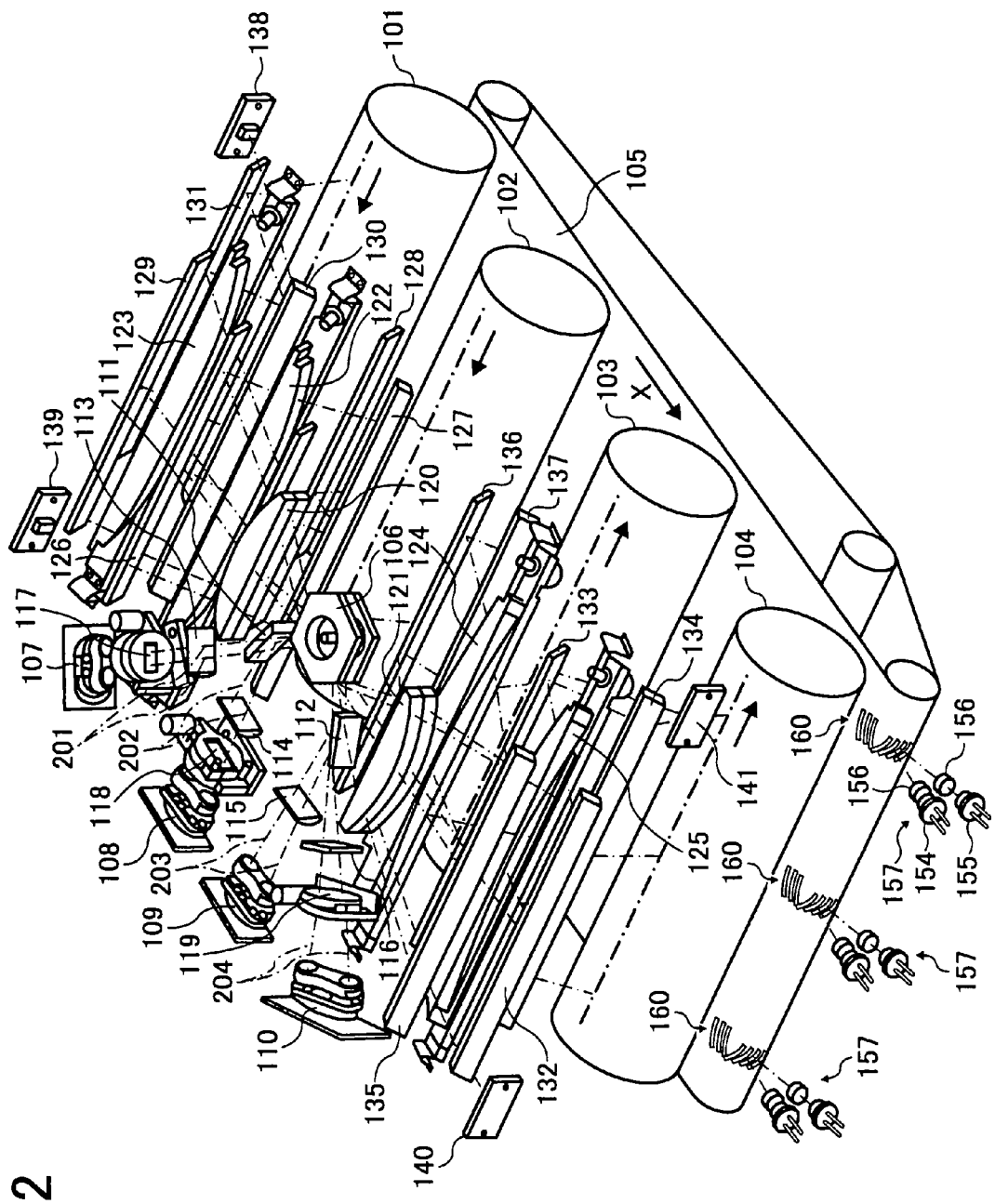
FIG. 2 is a perspective view of an optical scanning device that scans four stations according to the first embodiment.

FIG. 2 is a perspective view of an optical scanning device that scans four stations according to the first embodiment. Four photosensitive drums 101, 102, 103, and 104 are provided as respective four stations that correspond to colors of cyan, magenta, yellow, and black, and are divided into two groups each including two stations. "Opposed scanning" is performed so that beams are made incident from both sides of a polygon mirror 106, which is a single deflector, and are deflected to the mutually opposite directions for scanning.

The photosensitive drums 101 to 104 are arranged in a line at even intervals along a movement direction X of a transfer belt 105 which is a transfer element, and toner images of different colors are sequentially transferred to the transfer belt 105 and superposed one another to form a color image.

Optical scanning devices that respectively scan the photosensitive drums 101 to 104 are integrally formed, and each of the optical scanning devices scans a corresponding one of the photosensitive drums 101 to 104, which are media to be scanned, with light beams deflected by the polygon mirror 106. The polygon mirror 106 is made to rotate in the identical direction, but the scanning direction is opposite directions in opposite sides. Therefore, images are written so that a write-start position on one side coincides with a write-end position on the other side. The components forming the optical scanning device are accommodated in a housing (optical housing) (not shown).

In the first embodiment, a pair of semiconductor lasers are provided in each of the light source units 107, 108, 109, and 110 corresponding to the photosensitive drums 101 to 104 respectively, and light beams shifted by each one line pitch scan each of the photosensitive drums 101 to 104 according to a recording density in the sub-scanning direction, to simultaneously scan two lines each.

Light beams 201, 202, 203, and 204 respectively emitted from the light source units 107 to 110 are provided so that a light emitting position for each light source unit is made different in the sub-scanning direction. For example, the first embodiment is configured so that the light emitting position is provided differently for each of the light source units 107 to 110 by a predetermined height (6 millimeters in this example). The light beams emitted from the light source units 108 and 109 are respectively returned by incident mirrors 111 and 112. The returned light beams respectively approach the light beams, in the main scanning direction, which are emitted from the light source units 107 and 110 and move directly toward the polygon mirror 106, to be made incident into the polygon mirror 106.

Cylinder lenses 113, 114, 115, and 116 have a flat surface on one side thereof and have a common curvature in the sub-scanning direction on the other side, and are arranged so that respective lengths of light paths to a deflection/reflection point of the polygon mirror 106 are the same as one another. The light beams 201 to 204 are focused so as to become linear-shaped beams on deflection facets of the polygon mirror 106 in the main scanning direction. The cylinder lenses 113 to 116 are respectively combined with imaging optical systems each including an fθ lens and an anamorphic lens, to allow the deflection/reflection points and the photosensitive drums 101 to 104 to be respectively coupled to each other in the sub-scanning direction, and a plane-tilt-correcting optical system is formed in this manner.

Optical-axis changing units 117, 118, and 119 are arranged in the stations except one for a reference color, that is, in the stations corresponding to the light beams other than the light beam 203 emitted from the light source unit 109 in the first embodiment, to stably maintain (correct) each scanning position of luminous fluxes of the light beams 201, 202, and 204.

The polygon mirror 106 is formed with a six-facet mirror and in two stages in the first embodiment. A middle portion thereof not used for deflection is provided with a groove so as to have a slightly smaller diameter than an inscribed circle of the polygon mirror, to reduce a windage loss. The thickness of one layer is about 2 millimeters in the first embodiment. It is noted that phases of the upper and lower stages of the polygon mirror are the same as each other.

Each of fθ lenses 120 and 121 has two layers which are integrally formed (or joined), and is formed into an non-circular arc surface with power so that the light beams 201 to 204 move at a constant velocity on the respective surfaces to be scanned of the photosensitive drums 101 to 104 following a rotation of the polygon mirror 106. An imaging optical system is formed with the fθ lenses and anamorphic lenses 122, 123, 124, and 125, each of which is arranged for each of the light beams 201 to 204. The light beams 201 to 204 are formed into beam spots respectively so as to form images on the respective photosensitive drums 101 to 104, and latent images are thus formed.

A plurality of return mirrors (explained later), which are three for one station in the first embodiment, are arranged in each of the stations so that light path lengths from the polygon mirror 106 to the respective surfaces to be scanned of the photosensitive drums 101 to 104 coincide with one another, and so that incident positions of the light beams on and incident angles thereof to the respective photosensitive drums 101 to 104 arranged at even intervals are equal to one another.

A light path of each station is explained below. The light beams 201 emitted from the light source unit 107 pass through the optical-axis changing unit 117 and the cylinder lens 113, are deflected by the upper stage of the polygon mirror 106, pass through the upper layer of the fθ lens 120, are reflected by a return mirror 126 to pass through the anamorphic lens 122, and are reflected by return mirrors 127 and 128 to be led to the photosensitive drum 102, to form a magenta image as a second station.

The light beams 202 emitted from the light source unit 108 pass through the optical-axis changing unit 118 and the cylinder lens 114, are reflected by the incident mirror 111, are deflected by the lower stage of the polygon mirror 106, pass through the lower layer of the fθ lens 120, are reflected by a return mirror 129 to pass through the anamorphic lens 123, and are reflected by return mirrors 130 and 131 to be led to the photosensitive drum 101, to form a yellow image as a first station.

The same goes for stations which are symmetrically arranged with respect to the polygon mirror 106 and face the stations on the other side. The light beams 203 emitted from the light source unit 109 pass through the incident mirror 112, are deflected by the lower stage of the polygon mirror 106, and are reflected by return mirrors 132, 133, and 134 to be led to the photosensitive drum 104, to form a black image as a fourth station. Furthermore, the light beams 204 emitted from the light source unit 110 are deflected by the upper stage of the polygon mirror 106, and are reflected by return mirrors 135, 136, and 137 to be led to the photosensitive drum 103, to form a cyan image as a third station.

In FIG. 2, boards 138 and 139 with a photosensor mounted thereon are arranged on a scanning start side while boards 140 and 141 with a photosensor mounted thereon are arranged on a scanning end side of an image recording area, and scanned light beams are detected in each station.

In the first embodiment, the boards 138 and 140 form a synchronization detection sensor, and the synchronization detection sensor is shared to attain each of write-start timings based on a detection signal. On the other hand, the boards 139 and 141 form an end detection sensor. The end detection sensor measures a time difference of detection signals between the end detection sensor and the synchronization detection sensor to detect a change in scanning speed, and resets a reference frequency of a pixel clock for modulating semiconductor lasers 211 and 212 by multiplying a changed detected scanning speed by the reference frequency inversely proportional to the detected scanning speed. Accordingly, it becomes possible to stably keep the magnification across the full width of images on the transfer belt 105, the images being recorded by the respective stations.

In the first embodiment, as shown in FIG. 2, a light emitting diode (LED) element 154 for illumination, a photosensor 155 that receives a reflected light, and a pair of condenser lenses 156 form a detecting unit 157. The detecting unit 157 is arranged at locations corresponding to a center and both sides of an image on the transfer belt 105. Furthermore, the toner images of black, cyan, magenta, and yellow are tilted about 45 degrees from the main scanning direction, and a line pattern group 160 called Chevron patch arranged in parallel to each other at a predetermined pitch is formed, to read a detected time difference between any color and the black as the reference color according to the movement of the transfer belt 105.

Figure 3:
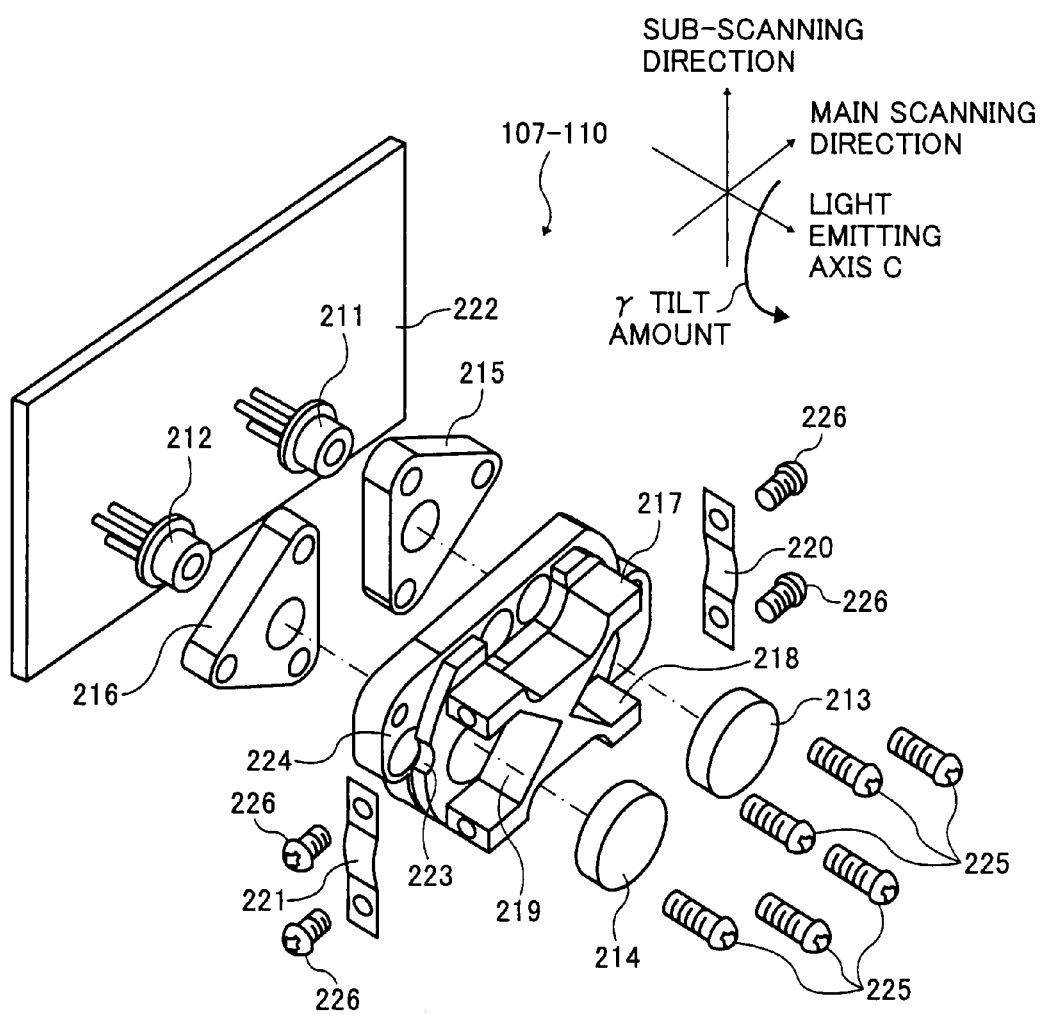
FIG. 3 is an exploded perspective view of a laser light-source unit included in the optical scanning device shown in FIG. 2.

FIG. 3 is an exploded perspective view of the laser light source units 107 to 110 included in the optical scanning device according to the first embodiment. All the light source units 107 to 110 have the same configuration as one another.

The semiconductor lasers 211 and 212 and coupling lenses 213 and 214 are symmetrically arranged in the main scanning direction with respect to a light emitting axis of a scanner unit of each color. The semiconductor lasers 211 and 212 are held by the rear side of a holder component 217 by press-fitting peripheries of packages of the semiconductor lasers 211 and 212 into each rear side of base components 215 and 216 respectively by screwing screws 225 in three holes of the base components, the screws 225 passing through the three holes from the front side of the holder component 217.

The coupling lenses 213 and 214 butt their peripheries against V-grooves 218 and 219, respectively, which are formed to open outwardly from the holder component 217. And the coupling lenses 213 and 214 are pressed inwardly by respective leaf springs 220 and 221 to be fixed to the holder component 217 with bolts 226. The coupling lenses 213 and 214 are fixed and held by the leaf springs 220 and 221 in the first embodiment, but can be fixed by being bonded using an ultraviolet cure adhesive.

In this case, arrangement of the base components 215 and 216 on contact planes (planes orthogonal to the optical axis) is adjusted so that light emitting points of the semiconductor lasers 211 and 212 are on the respective optical axes of the coupling lenses 213 and 214. The respective positions of the coupling lenses 213 and 214 on the V-grooves 218 and 219 (on the optical axes) are adjusted to be fixed so that the respective light beams emitted from the coupling lenses become parallel pencils.

Each optical axis of the light beams 201 to 204 is tilted to be set in a direction in which the optical axes mutually intersect each other with respect to a light emitting axis C shown in FIG. 3. In the first embodiment, a tilt of a support element is set so that the intersecting position is close to the reflective surface of the polygon mirror.

A printed board 222 with a drive circuit mounted thereon is attached and fixed, with bolts, to a base protruded on the holder component 217. Each lead terminal of the semiconductor lasers 211 and 212 is inserted into a through hole and soldered, and the light source unit 107 (108 to 110) is integrally formed.

Each of the light source units 107 to 110 is positioned by inserting a cylinder portion 223 of the holder component 217 into an engagement hole formed on the wall surface of the optical housing so that the height of the through hole is made different from the other heights, and a contact plane 224 is pushed against the wall surface and is screwed with a screw.

At this time, by adjusting a tilt amount γ based on the cylinder portion 223 as a reference, a beam spot interval can be made coincident with a scanning line pitch according to a recording density.

Figure 4:
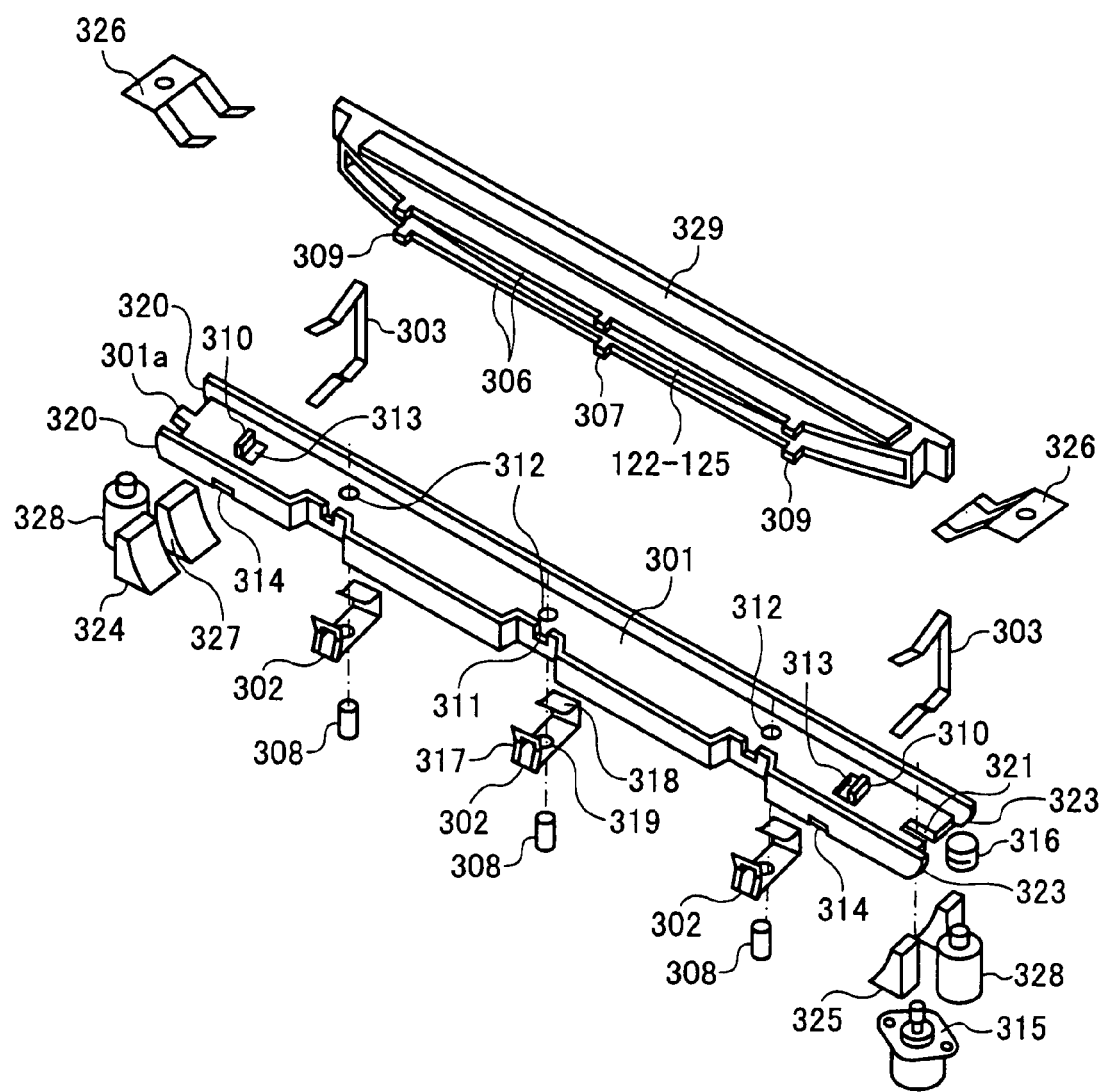
FIG. 4 is an exploded perspective view of a support structure of an anamorphic lens according to the first embodiment.

FIG. 4 is an exploded perspective view of a support structure of the anamorphic lens 122. FIG. 5A is a front view of the support structure of the assembled anamorphic lenses 122 according to the first embodiment. FIG. 5B is a side view taken along line A-A of FIG. 5A. All the anamorphic lenses 122 to 125 have the same configuration as one another.

The anamorphic lens 122 has a rib portion 306 made of resin and formed so as to surround a lens portion, has a projection 307 for positioning provided at a central part thereof, and also has two projections 309 for positioning formed on both sides of the projection 307.

In the long plastic optical element such as the anamorphic lens 122, warp occurs easily in its longitudinal direction, particularly, in a direction orthogonal to the scanning surface depending on molding conditions and residual stress. The amount of warp becomes tens of microns, and the amount and the direction of the warp vary depending on models.

The anamorphic lens 122 is long and has low rigidity. Therefore, even if slight stress is applied to the lens, deformation (warp) easily occurs, and the anamorphic lens 122 is deformed also by a difference between thermal expansions if there is a vertical temperature distribution in association with changes in ambient temperature. Therefore, it is difficult to maintain with high precision the bending and tilt of scanning lines between the stations.

In the first embodiment, a plate glass 329 being a reinforcing member is attached to an upper surface of the anamorphic lens 122 through a vibration damping tape (not shown) along the longitudinal direction, to improve the rigidity. By attaching the plate glass 329 to the anamorphic lens 122 on, for example, a stone surface plate excellent in surface accuracy, the warp in the longitudinal direction, which has occurred upon molding, is corrected, and the corrected state can be maintained.

The plate glass 329 attached to the anamorphic lens 122 enables the shape of the anamorphic lens 122 to be stably maintained. Even if a local stress upon tilt adjustment explained later is applied to the anamorphic lens 122, this does not cause the anamorphic lens 122 to be deformed. In other words, the shape upon assembly of the lens is maintained.

A support plate 301 is formed with sheet metal in a U shape, and the projection 307 of the anamorphic lens 122 is engaged in a notch 311 formed in an upward bent part of the support plate 301. The lower surface of the rib portion 306 abuts against upward bent parts 310 to be positioned, and a pair of leaf springs 303 is used to push the rib portion 306 from its upper side to keep both ends of the rib portion 306. The leaf spring 303 holds the anamorphic lens 122 laid on the support plate 301 from outside the anamorphic lens 122, and one end of the leaf spring 303 is protruded inwardly through an opening 313 and is inserted into an opening 314 to fix the anamorphic lens 122.

Threaded holes 312 are formed in the support plate 301, adjusting screws 308, which are pressing members, are screwed into the threaded holes 312, and the leaf springs 302, which are elastic members, hold the support plate 301 from the outside thereof. Both ends 317 and 318 of the respective leaf springs 302 are engaged inside of the lower side of the rib portion 306 to be fixed, and the adjusting screws 308 are biased so that the lower surface of the rib portion 306 comes in contact with the adjusting screws 308.

By assembling the components in this manner, a fine adjustment becomes possible so that the pressing force exerted on the anamorphic lens 122 by the adjusting screw 308 and the elastic force exerted on the anamorphic lens 122 by the leaf spring 302 act in mutually opposite directions.

A hole 319 of the leaf spring 302 is provided to pass the adjusting screw 308 therethrough. In the first embodiment, the adjusting screw 308 is also provided between the central part of the support plate 301 and each end side of the anamorphic lens 122.

As shown in FIGS. 4 and 5A, both ends of the anamorphic lens 122 are supported by edges of the upward bent parts 310, and the center of the anamorphic lens 122 is supported by the adjusting screw 308. If the amount of protruding portion of the adjusting screw 308 is below the height of the upward bent part 310, the anamorphic lens 122 warps to protrude downward from a bus line 3. If the amount of protruding portion of the adjusting screw 308 is higher than the height of the upward bent part 310, the anamorphic lens 122 warps to protrude upward from the bus line 3. Therefore, by adjusting the adjusting screws 308, the focal line of the anamorphic lens 122 is bent in the sub-scanning direction, which enables the scanning line bending to be corrected.

Generally, the scanning line bending is caused by an error in arrangement of optical elements that form the optical system or by warp produced upon molding. The anamorphic lens 122 is bent in a direction in which the bending is cancelled out, and this enables the linearity to be corrected. In other words, the respective directions and amounts of bending between the scanning lines can be made uniform.

In the first embodiment, the warp of the anamorphic lens 122 in the longitudinal direction produced upon molding the anamorphic lens 122 is corrected at an assembly stage by attaching the plate glass 329 to the anamorphic lens 122. It is noted that the plate glass 329 is generally fragile, and so, the adjusting screw 308 is desirably provided to be pressed from the side where the plate glass 329 is not attached.

When internal temperature of the image forming apparatus changes, the anamorphic lens 122 expands, or expands and contracts. At this time, the anamorphic lens 122 is fixed at both ends thereof by spring force of the leaf springs 303, which enables to prevent free expansion or expansion/contraction. As a result, tensile stress or compressive stress is produced. If the leaf springs 302 are not provided, the production of the stress causes the anamorphic lens 122 to warp upward or downward, and the scanning line bending of a quadratic curve shape occurs. This bending is solved by the force acting on between the leaf spring 302 and the adjusting screw 308.

More specifically, the pressing force exerted on the anamorphic lens 122 by the adjusting screw 308 and the elastic force exerted on the anamorphic lens 122 by the leaf springs 302 are made to obtain strength so that these forces cancel out occurrence of the warp due to the tensile stress or the compressive stress, or so that these forces surpass the spring force of the leaf springs 303. And these forces also surpass the frictional force produced in the leaf springs 303 to help the expansion or expansion/contraction of the anamorphic lens 122. This enables occurrence of the scanning line bending of the quadratic curve shape to be suppressed.

The rigidity of the anamorphic lens 122 is enhanced by attaching the plate glass 329, which enables the warp upon expansion or expansion/contraction to be reduced (corrected), and enhanced rigidity acts as force against the frictional force in the leaf springs 303.

Alternatively, a contact portion of the anamorphic lens 122 with the leaf spring 303 can be made slippery to reduce the frictional force so that the tensile stress or the compressive stress can be reduced. More specifically, an increase in the surface accuracy of the contact portion of the anamorphic lens 122, an increase in hardness of the anamorphic lens 122, application of a lubricant to the anamorphic lens 122, or insertion of a smooth material into the contact portion can be a countermeasure for the above problem.

On the other hand, if the internal temperature of the image forming apparatus rises, a temperature distribution difference occurs in the main scanning direction and the sub-scanning direction of a plastic optical element and of a material holding the optical element. This causes the tensile stress or the compressive stress to vary and a position of an inflection point of scanning line bending to change.

The change in the inflection point of the scanning line bending indicates that an adjusting (pressurizing) position is displaced, and the effect of correction to the scanning line bending is reduced. That is, the scanning line bending returns to a previous state that is before the adjustment. Resultantly, large positional displacement of the scanning lines occurs between the stations. Accordingly, image degradation (color misregistration) occurs.

In the first embodiment, however, by attaching the plate glass 329 to the side face (upper surface) of the anamorphic lens 122, a load dispersion effect of the pressing force by the plate glass 329 can be obtained. This enables adjustment effect to be maintained even if the position of the inflection point of the scanning line bending varies due to changes in temperature.

As for a support fixing position of the leaf spring 303, because the support point by the leaf spring 302 and the adjusting screw 308 is provided at the central part of the anamorphic lens 122, it is necessary to arrange the support fixing position closer to the end side from an intermediate point between the end of the anamorphic lens 122 and the support point, for correcting the warp at the end of the anamorphic lens 122. If the support fixing position of the leaf spring 303 is set to any position closer to the central part rather than the intermediate point, respective warps occurring at both ends are not corrected. Therefore, color misregistration cannot substantially be suppressed. Furthermore, since the leaf spring 303 cannot make its edge parts as fixed points, the inner side of about 2 millimeters even from the endmost needs to be set as the fixed point. Thus, it is necessary to satisfy equation (1).

$$2 \leq P \leq L/4 \tag{1}$$

Where L (millimeters) is a length of the anamorphic lens 122 in the longitudinal direction, and P (millimeters) is a distance from the end of the anamorphic lens 122 to the support fixing position.

The end area of the adjusting screw 308 is in surface contact with the anamorphic lens 122, which is applied with pressing force, to avoid concentration of the force produced when the anamorphic lens 122 is pressed linearly or by the point. Accordingly, it is possible to prevent an engagement of the adjusting screw 308 into the anamorphic lens 122 or a local deformation such that the lens is broken.

Depending on a relationship between a range where the elastic force is applied by the leaf spring 302 and a range where the pressing force is applied by the adjusting element (adjusting screw 308), a desired effect cannot be obtained, because the local deformation can occur if the range of the pressing force of the adjusting element is narrower than the range of the elastic force of the leaf spring.

To obtain the desired effect, "range where pressing force is applied by the adjusting element">"range where elastic force is applied by the leaf spring" is set.

The adjusting screw can basically correct the scanning line bending of the quadratic curve shape if one adjusting screw is provided at the central part. However, the adjusting screw is provided in a plurality of locations along the main scanning direction, i.e. in three locations in total such as the central part, and intermediates between the central part and each of the upward bent parts 310. It is thereby possible to correct the bending even if M-shaped or W-shaped bending occurs caused by the pressing force and elastic force at the central part and by the tensile stress or the compressive stress due to frictional force at both ends of the anamorphic lens 122.

The support plate 301 attached with the anamorphic lens 122 attached is positioned by fitting a projection 301a formed in the end of the support plate 301 into a space 327 between a pair of positioning guides 324 provided in the optical housing side, to be fixed to support parts 328 provided in the optical housing, and is supported by leaf springs 326 which downwardly bias in FIG. 4. As shown in FIG. 5A, ends 320 and 323 of the support plate 301, and the positioning guides 324 and 325 are formed into a shape along a circular arc around a sign "O" in FIG. 5A, and corresponding portions are supported by the respective leaf springs 326 to contact each other.

A stepping motor 315 is fixed to the optical housing, and a feed screw 315a formed at one end of an output shaft of the stepping motor 315 is screwed into a threaded hole of a movable cylinder 316, and a notch 321 formed at one end of the support plate 301 and a concave portion of the movable cylinder 316 are fitted to each other. The fitting enables displacement of the support plate 301 in the sub-scanning direction (direction of the height of the anamorphic lens) through the rotation of the stepping motor 315. Accordingly, the anamorphic lens 122 can perform rotational adjustment γ around the "O" within a plane orthogonal to the optical axis, following a normal or a reverse rotation of the stepping motor 315. In association with the adjustment, the bus line 3 of the anamorphic lens 122 is tilted in the sub-scanning direction, and thus, it is possible to tilt the scanning line as an image forming position after the beams pass through the anamorphic lens.

In the first embodiment, the adjusting screw 308 is arranged in all the anamorphic lenses 122 including the station as a reference. The scanning lines of the other stations are adjusted to be made coincident with the direction and the amount of the scanning line bending as the reference upon manufacturing, and the tilt adjustment can be performed while the arrangement is kept as it is.

Figure 6:
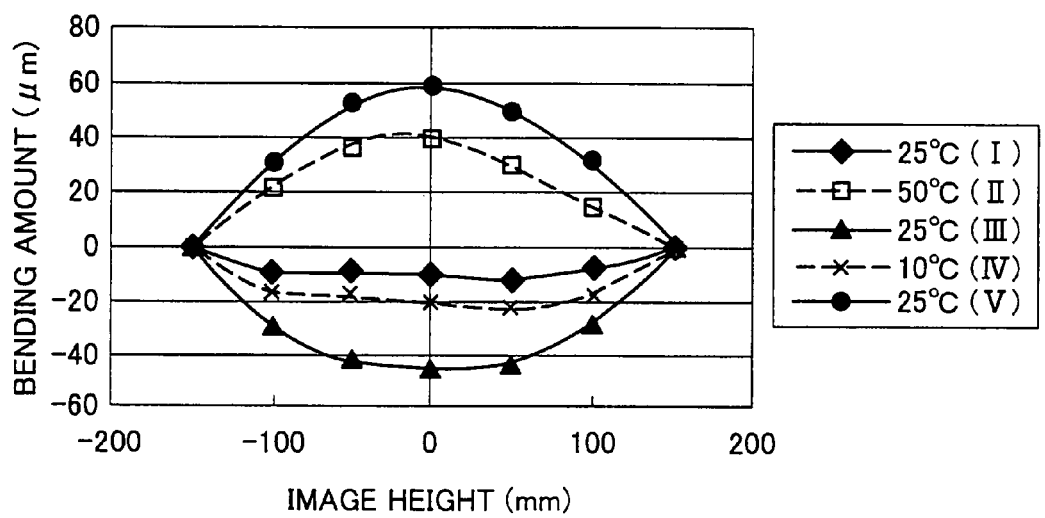
FIG. 6 is a graph representing the result of experiments where leaf springs for the anamorphic lens were not provided and both ends of the anamorphic lens were pressed, held, and fixed by another type of leaf springs by changing atmospheric temperature from 10° C. to 50° C. using a temperature-controlled bath according to the first embodiment.

FIG. 6 is a graph representing the result of experiments where the leaf springs 302 for the anamorphic lens 122 were not provided and both ends of the anamorphic lens 122 were pressed, held, and fixed by the leaf springs 303 by changing atmospheric temperature from 10° C. to 50° C. using a temperature-controlled bath.

The anamorphic lens 122 was molded with plastics, and the plate glass 329 was attached to the side face (upper surface) of the rib portion 306 of the anamorphic lens 122. More specifically, the length of the rib portion 306 in the longitudinal direction is 260 millimeters, the length in the optical axis direction is 17 millimeters, and the length in the sub-scanning direction is 15 millimeters. The plate glass 329 has a thickness of 6 millimeters, a length of 240 millimeters, and a weight of 40 grams. The atmospheric temperature was sequentially changed in order of 25° C. (I), 50° C. (II), 25° C. (III), 10° C. (IV), and 25° C. (V)

As shown in FIG. 6, if the plate glass 329 is attached to the anamorphic lens 122 and the leaf spring 302 and the adjusting screw 308 were not provided at the central part of the anamorphic lens 122, the scanning line bending protruded upward or downward due to the stress produced by expansion and contraction of the anamorphic lens 122 and also the frictional force of the leaf spring 303. A deviation between the upward bending and the downward bending was 104 micrometers at maximum. If the deviation discretely occurs in the stations, color misregistration occurs in an image. The reason why the scanning line bending occurs at 25° C. in the upper side or the lower side is because this depends on balance between the stress and the frictional force upon expansion and contraction.

Figure 7:
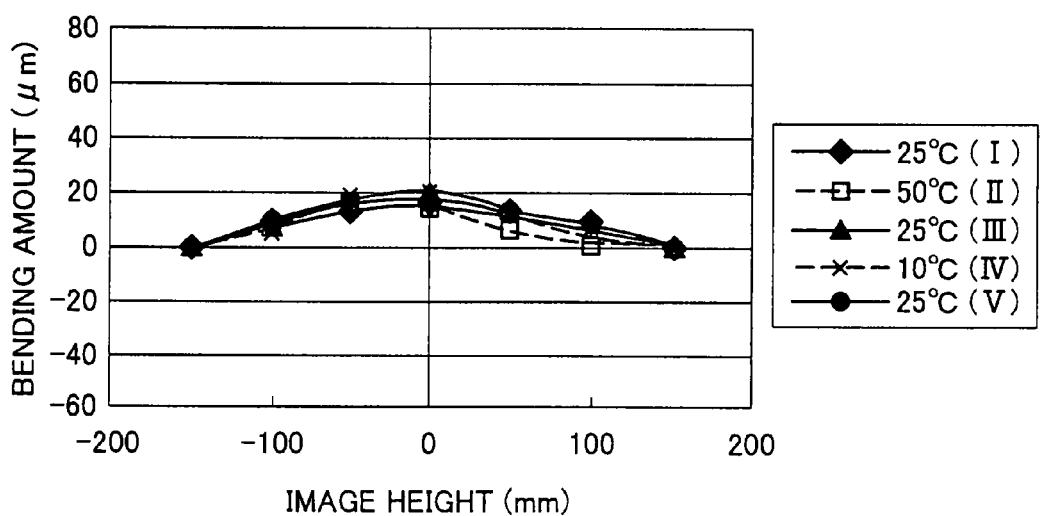
FIG. 7 is a graph representing the result of experiments where the leaf spring and an adjusting screw for the anamorphic lens were provided at a central part of the anamorphic lens by changing the atmospheric temperature from 10° C. to 50° C. using the temperature-controlled bath.

FIG. 7 is a graph representing the result of experiments where the leaf spring 302 and the adjusting screw 308 for the anamorphic lens were provided at the central part of the anamorphic lens 122 by changing the atmospheric temperature from 10° C. to 50° C. using the temperature-controlled bath.

The elastic force of the leaf spring 303 was set to 600 grams. A scanning line bending was initially adjusted to protrude upward by about 20 micrometers. However, even if the atmospheric temperature was changed, the deviation of the scanning line bending occurs only by 8 micrometers at maximum.

From the result, it is understood that the support and adjustment of the anamorphic lens 122 by the support structure according to the first embodiment enable suppression of the amount of color misregistration between the stations even if the atmospheric temperature changes.

Figure 8:
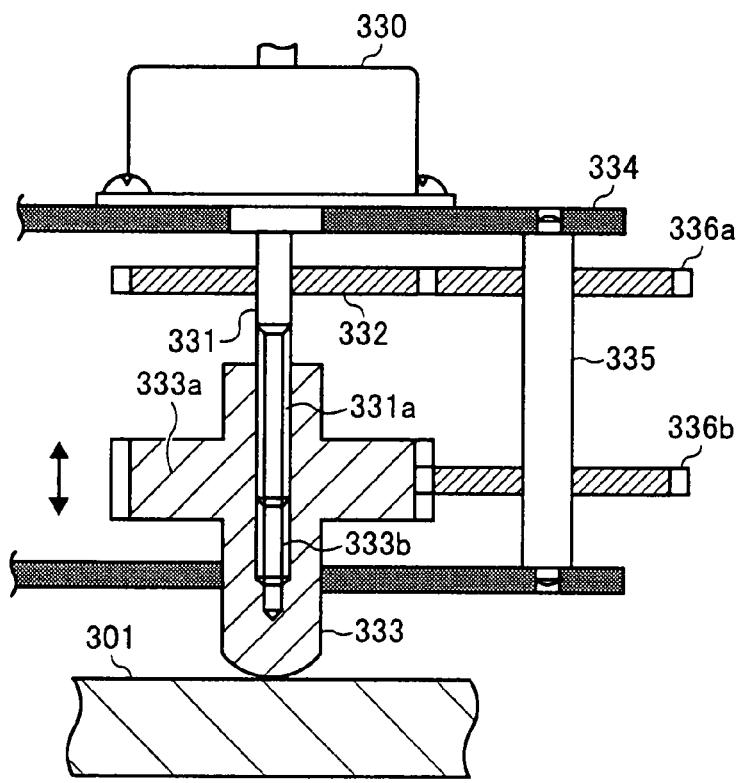
FIG. 8 is an enlarged side view of a periphery of a stepping motor indicating a scanning-line-tilt adjusting mechanism according to the first embodiment.

FIG. 8 is an enlarged side view of a periphery of a stepping motor 330 indicating a scanning-line-tilt adjusting mechanism according to the first embodiment.

In FIG. 8, a spur gear 332 is provided in an output shaft 331 of the stepping motor 330, and a screw 331a with a thread of predetermined pitch is formed in the output shaft 331. And the screw 331a is screwed into a threaded hole 333b provided in a movable cylinder 333 with a spur gear 333a integrally formed in the outside of the screw 331a. Furthermore, a spindle 335 is vertically provided between holding elements 334 provided opposite to each other to hold the stepping motor 330 and the movable cylinder 333. Two-stage gear 336a and 336b, which are engaged with the spur gears 332 and 333a respectively, are fixed to the spindle 335, to form a differential screw mechanism. As shown in FIG. 8, the edge of the movable cylinder 333 is in contact with the support plate 301.

The differential screw mechanism is configured such that the output shaft 331 and the movable cylinder 333 undergo a rotational drive force of a gear train (spur gears 332 and 333a, and two-stage gear 336a and 336b) to rotate in the same direction. The number of teeth of each of the gears is made to be different in the gear train, to cause a rotational phase difference to be provided between the output shaft 331 and the movable cylinder 333. Accordingly, fine movement in a thrust direction can be realized. In this manner, an adjusting resolution of the scanning-line-tilt adjusting mechanism can be enhanced, and therefore the adjusting resolution can be improved one digit or more as compared with an adjusting resolution of conventional scanning-line-tilt adjusting mechanisms formed with screws and nuts without using the gear train.

A modification of the scanning-line-tilt adjusting mechanism shown in FIG. 8 can achieve space saving by integrally forming a two-stage gear bearing portion with the optical housing. The two-stage gear bearing portion is obtained by setting an output shaft of the stepping motor as a biaxial type, attaching a screw to one side of the output shaft, and attaching a spur gear to the other side of the output shaft to provide a phase difference between the screw and the nut (the movable cylinder).

Figure 9:
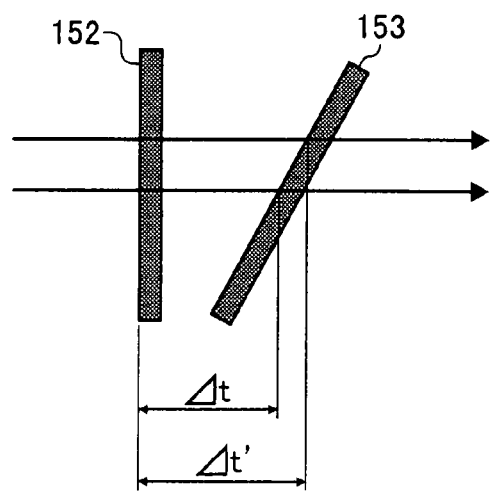
FIG. 9 is a schematic of an arrangement of a photosensor for detecting synchronization according to the first embodiment.

FIG. 9 is a schematic of an arrangement of a photosensor for detecting synchronization according to the first embodiment. Any one of photosensors in the boards 138 to 141 is formed with a photodiode 152 provided orthogonal to the main scanning direction and a photodiode 153 provided not in parallel to the photodiode 152 as shown in FIG. 9. By measuring a time difference ($\Delta t - \Delta t'$) of light beams reaching the photodiode 153 from the photodiode 152, a positional displacement $\Delta y$ of the light beams in the sub-scanning direction can be detected.

The positional displacement $\Delta y$ in the sub-scanning direction is expressed by the following equation (2) using a tilt angle γ of the photodiode 153 and a scanning speed V of a light beam.

$$\Delta y = (V/\tan \gamma) \cdot (\Delta t - \Delta t') \quad (2)$$

In the first embodiment, an optical-axis deflecting unit explained later is used to keep the photodiode 153 so that $\Delta t$ becomes constant, and hence, a radiation position can be controlled so that misregistration of the respective color images in the sub-scanning direction do not occur.

Furthermore, if the photosensor is provided on both the scanning start side and the scanning end side, a difference in sub-scanning displacements at the ends, i.e. a tilt of the scanning line can be detected.

Figure 10:
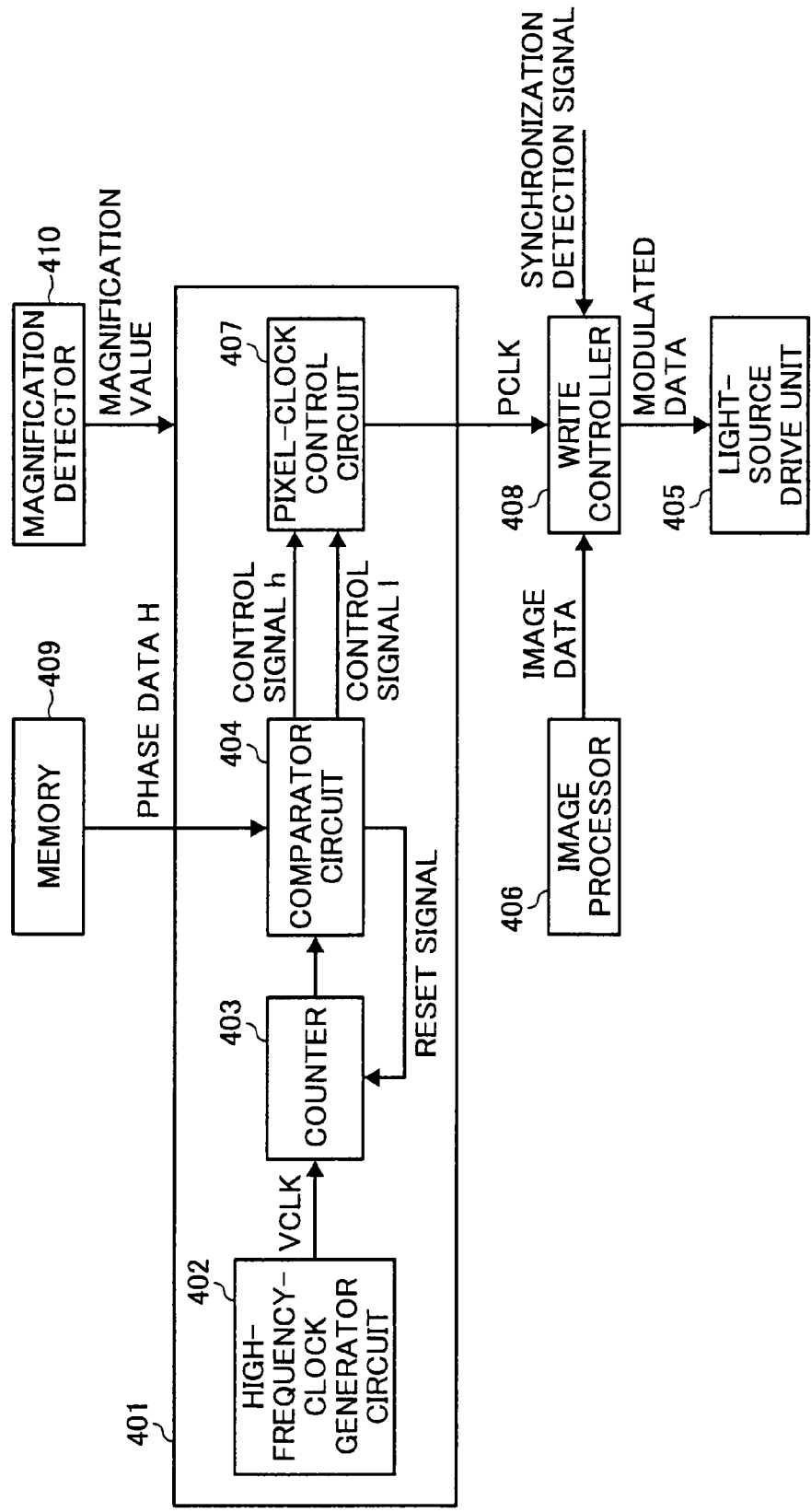
FIG. 10 is a block diagram of a write control circuit of a semiconductor laser according to the first embodiment.

FIG. 10 is a block diagram of a write control circuit of a semiconductor laser according to the first embodiment.

In a pixel clock generator 401, a counter 403 counts a high-frequency clock VCLK generated in a high-frequency-clock generator circuit 402, a comparator circuit 404 compares a set value L previously set with phase data H which is read from a memory 409 as a transition timing of a pixel clock and instructs the amount of phase shift based on the count value and a duty ratio. When the count value coincides with the set value L, the comparator circuit 404 outputs a control signal I for instructing falling of a pixel clock PCLK to a pixel-clock control circuit 407. When the count value coincides with the phase data H, the comparator circuit 404 outputs a control signal h for instructing rising of the pixel clock PCLK to the pixel-clock control circuit 407. At this time, the counter 403 is reset simultaneously with the outputting of the control signal h, and by again counting the clock from zero, a continuous pulse train can be formed.

The phase data H is provided for each clock in this manner, to generate a pixel clock PCLK of which pulse period is sequentially varied. The pixel clock PCLK is also used to correct magnification, and hence, a signal is generated based on a magnification value detected by a magnification detector 410.

In the first embodiment, the pixel clock PCLK is obtained by dividing the high-frequency clock VCLK by 8, and the phase can be changed with a resolution of ⅛ clock.

Figure 11:
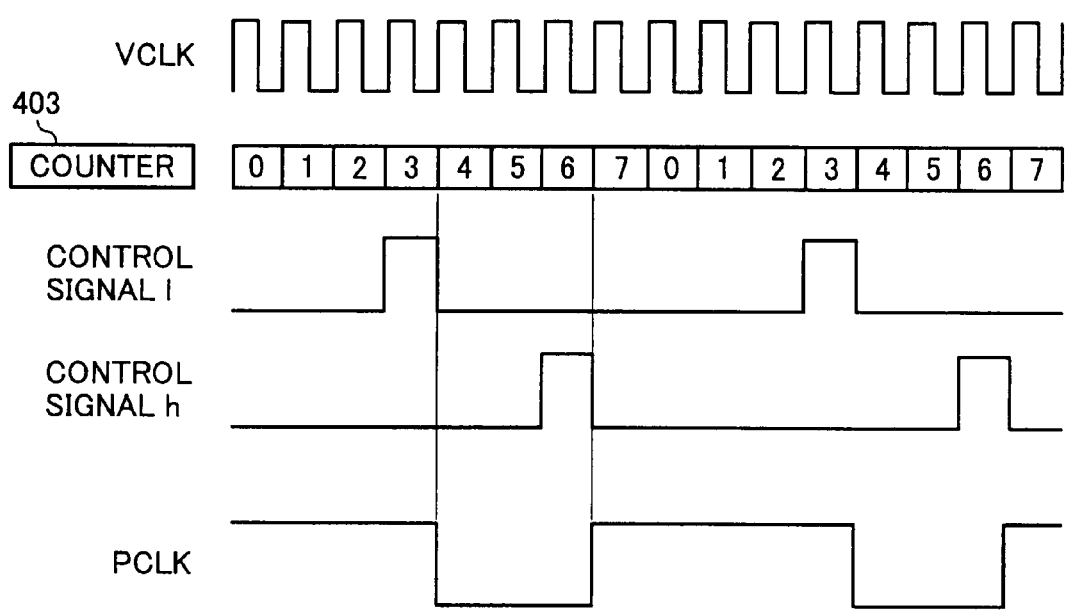
FIG. 11 is a time chart of an example in which a phase is delayed by ⅛ clock of the semiconductor laser according to the first embodiment.

FIG. 11 is a time chart of an example in which a phase is delayed by ⅛ clock of the semiconductor laser according to the first embodiment. If a duty is assumed to be 50%, a set value L of 3 is given to the counter 403, and the counter 403 counts 4 to lower the pixel clock PCLK. If the phase is delayed by ⅛ clock, the phase data H of 6 is given to the counter 403, and the counter 403 counts 7 to raise the pixel clock PCLK. The counter is reset simultaneously, and thus, the pixel clock PCLK is lowered again at 4 counts. In other words, an adjacent pulse period is reduced by ⅛ clock.

The pixel clock PCLK generated in this way is output to a write controller 408. The write controller 408 allocates image data read by an image processor 406 to respective pixels based on a synchronization detection signal sent from a synchronization detection sensor (not shown) with the pixel clock PCLK as a reference, to generate modulated data. The write controller 408 outputs the generated modulated data to a light-source drive unit 405, which lights the semiconductor lasers 211 and 212.

By arranging pixels for shifting a phase at predetermined intervals in this manner, it is possible to correct a partial magnification error along the scanning direction.

Figure 12:
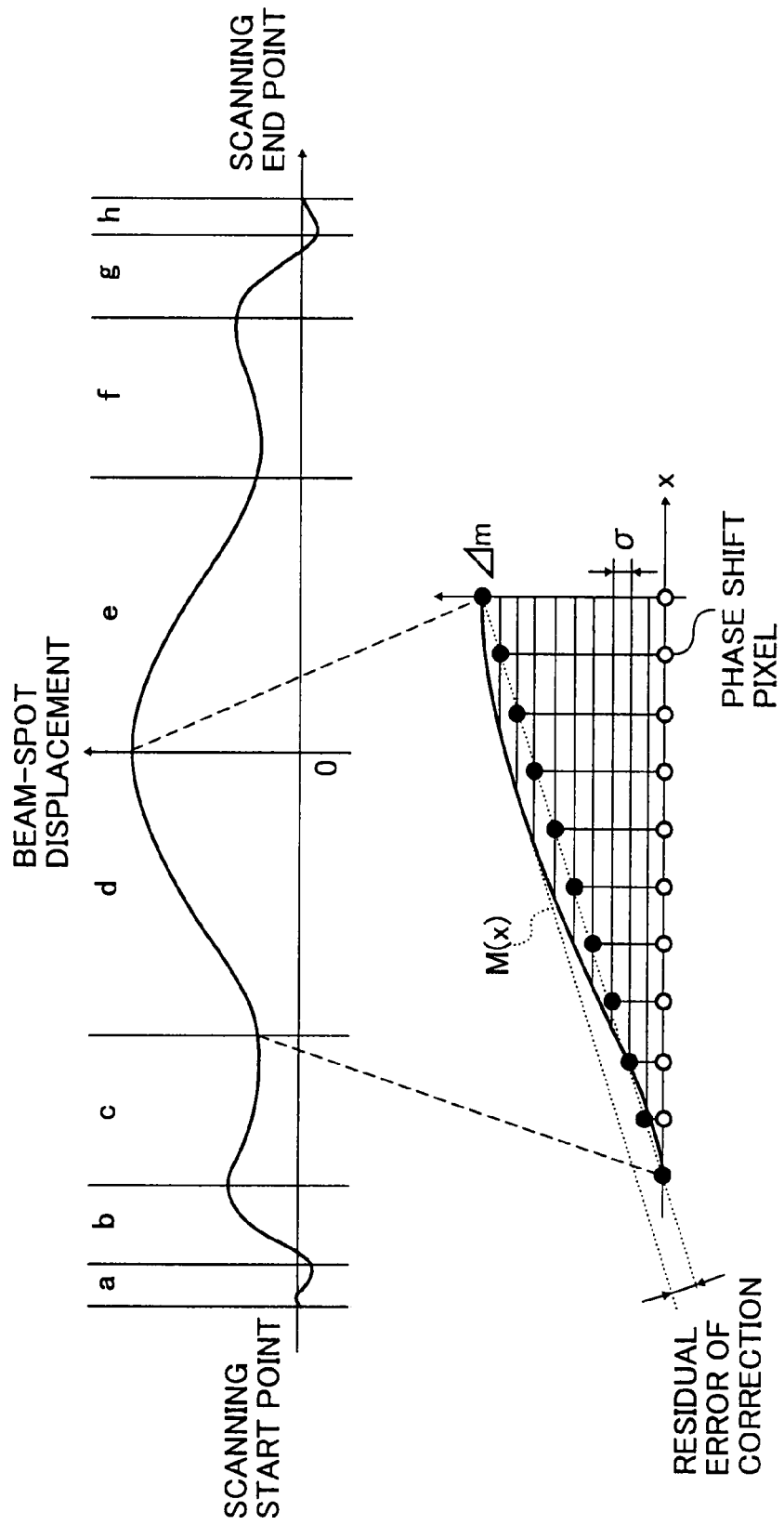
FIG. 12 is a graph representing an amount of beam-spot displacement of a laser beam in the main scanning direction according to the first embodiment.

In the first embodiment, a main scanning area is divided into a plurality of blocks (a to h) as shown in FIG. 12, and an interval of a pixel for shifting a phase and a shift amount for each divided block are set as follows to be given as phase data. FIG. 12 is a graph representing an amount of beam-spot displacement of a laser beam in the main scanning direction according to the first embodiment.

A change M(x) in the beam-spot displacement is expressed by an integration value as shown in the following equation (3), where L(x) is a change of a magnification with respect to a main scanning position x.

$$M(x) = \int L(x)dx \quad (3)$$

It is assumed that a beam-spot displacement is to be corrected as being zero at the starting point and the end point of the divided block. An interval of pixels whose phase is shifted is expressed by the following equation (4), where Δm is a displacement in width between the divided blocks in accordance with the change of magnification of an arbitrary divided block, s (constant) is a resolution of a phase shift, and N is the number of pixels in a divided block.

$$D \cong N/(\Delta m/s) \quad (4)$$

Where D is an integer. The phase is simply shifted "s" by "s" for each D pixel. In the first embodiment, s is ⅛ pixel. In this case, a residual error in the beam-spot displacement becomes a maximum in an intermediate position of the divided blocks, and respective divided positions and the number of divided blocks is determined so that the residual error falls in an allowable range.

Superimposition accuracy of color images is generally maintained by reading detection patterns of toner images formed on the transfer belt 105 to detect a main scanning magnification, sub-scanning registration, and a tilt of the scanning line as displacement from the station as the reference, and by periodically controlling to correct the displacement. The correction control is performed at timing upon startup of the apparatus or between jobs. If the number of sheets to be printed for one job is increased, the process is interrupted in the middle of the operation to perform the correction control to suppress the displacement due to the change in temperature during the process.

Figure 13:
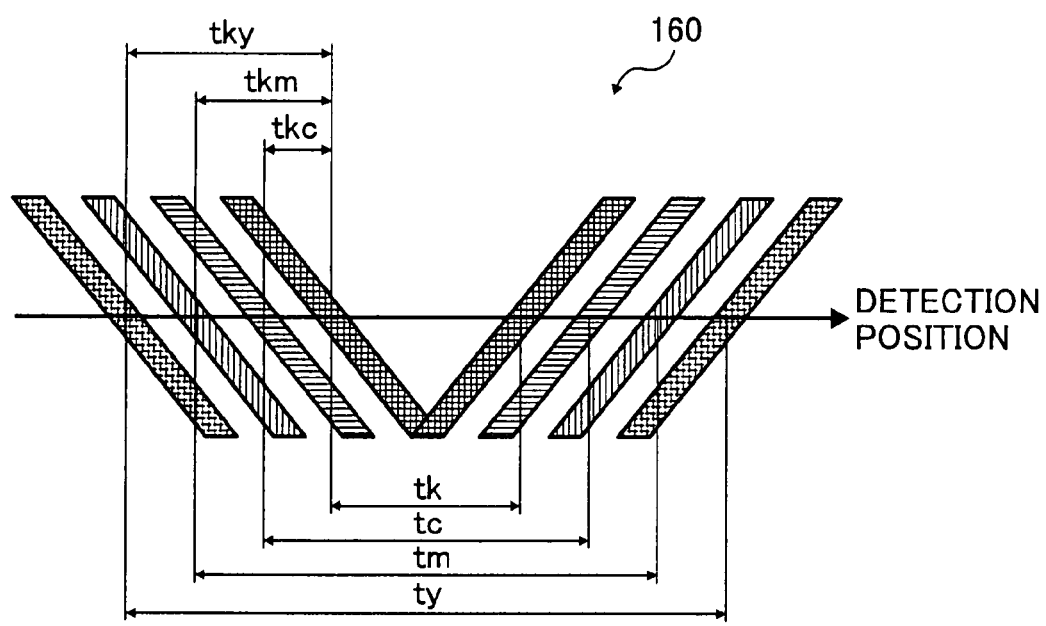
FIG. 13 is a schematic of an example of a line pattern group for detecting positional displacement according to the first embodiment.

FIG. 13 is a schematic for explaining an example of a line pattern group for detecting positional displacement according to the first embodiment. The line pattern group 160 is used to read a toner image on a detection line along movement of the transfer belt 105. The vertical direction in FIG. 13 corresponds to the main scanning direction, and line patterns are formed in order of yellow, magenta, cyan, black, cyan, magenta, and yellow, from the left. Each sub-scanning registration of the colors is obtained from a difference between each of detected time differences tky, tkm, and tkc from the black as a reference color and each corresponding theoretical value of the detected time differences. And each color misregistration in the main scanning direction is obtained from a difference between each of detected time differences tk, tc, tm, and ty of a pair of line patterns having a different tilt angle and each corresponding theoretical value of the detected time differences.

A displacement in a scanning line tilt is obtained from a difference between sub-scanning registrations in both ends of the scanning line, and tilt adjusting units for the anamorphic lenses 122, 123, 124, and 125 are driven to correct the displacement.

The sub-scanning registration is obtained by an average of detected values, and one-scanning line pitch, i.e. every one facet of the polygon mirror 106, is set as a unit and writing timings in the sub-scanning direction are matched with each other.

Furthermore, because higher quality of color images is increasingly required in recent years, misregistration need to be coincident with each other in the accuracy of one-scanning line pitch or less. Therefore, the radiating positions are finely adjusted by using the optical-axis changing units 117, 118, and 119, to enable correction of even a fine displacement less than one-scanning line pitch, of sub-scanning misregistration detected using toner images, which cannot be corrected by the writing timing, and a reference value (initial value) for the radiating positions is set accordingly.

On the other hand, among pages, the photodiodes 152 and 153 are used to perform feed-back correction of a difference between a detected value and a reference value set based on a measured value stored during image recording. Accordingly, the reference value can be stably kept up to the time for periodic correction by a next toner patch.

It is noted that the reference value is not necessarily a fixed value. For example, the value can be set as a value periodically changing corresponding to speed fluctuation of the transfer element.

The main-scanning magnification is obtained from a difference between main-scanning registrations at both ends. By adjusting the timing of the reference frequency of pixel clocks for modulating the respective semiconductor lasers 211 and 212 and the timing of the synchronization detection signal, a full width and a write-start position of an image are aligned. As for the pages, a magnification change is continuously monitored based on detected times of a synchronization detection signal and an end detection signal, and the reference frequency is corrected so that the full width does not change even if the temperature changes. At the same time, phase data is weighted by previously predicting the magnification change for each divided block, which occurs in accordance with the temperature change, so that a distortion of the magnification does not occur even in the height of an intermediate image. The phase data weighted in the above manner is read from a data table corresponding to a variable amount of the magnification across the full width, so that the magnification is made uniform across the entire area in the main scanning direction.

Figure 14:
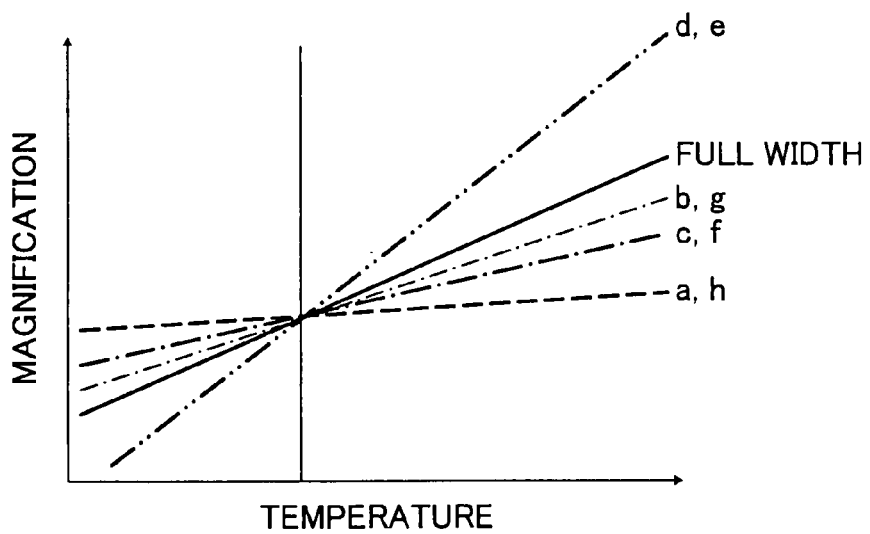
FIG. 14 is a graph representing changes of magnification with respect to temperature in each of divided blocks shown in FIG. 12.

FIG. 14 is a graph representing changes of magnification with respect to temperature in each of the divided blocks a to h in the graph shown in FIG. 12. In FIG. 14, each magnification of the divided blocks changes in proportion to the change in the magnification across the full width, and the measured value of the magnification across the full width is allocated to the changes in the magnifications of the divided blocks a to h.

In the first embodiment, the periodic correction based on detected toner images is performed the fluctuation during job is monitored, and the correction is performed even between pages. Thus, it is possible to keep the superimposition accuracy of the color images without interruption of printing operation during the job.

As explained above, according to the first embodiment, the resin-molded plastic lens is used to improve the constant speed performance of a laser beam deflected and scanned by the optical scanning device. However, it is possible to improve the beam-spot displacement in the main scanning direction due to the fluctuation in the ambient temperature occurring during the use of the lens, and to perform scanning and exposure which are stably maintained.

An optical scanning device according to a second embodiment is explained in detail below. The second embodiment is different from the first embodiment in that a liquid-crystal deflecting optical element is used as an optical-axis changing unit for the laser light-source unit. The rest of the components are the same as these of the first embodiment, and the same reference numerals represent the same elements, and thus, explanation is omitted.

Figure 15:
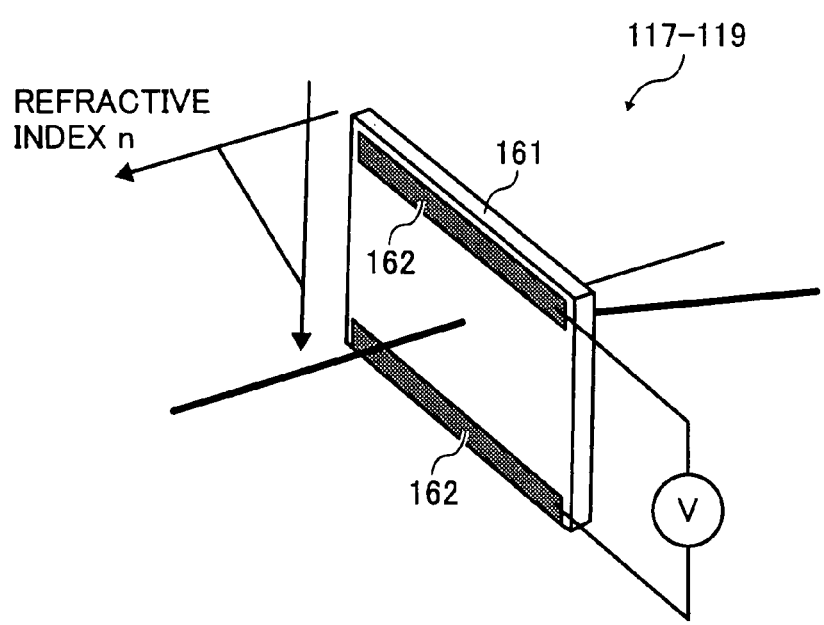
FIG. 15 is a perspective view of a liquid-crystal deflecting optical element as an example of an optical-axis changing unit according to a second embodiment of the present invention.

FIG. 15 is a perspective view of a liquid-crystal deflecting optical element 161 as an example of the optical-axis changing unit according to the second embodiment.

In the liquid-crystal deflecting optical element 161 as the optical-axis changing units 117 to 119, liquid-crystal orientation changes by applying a potential difference to across two vertically provided electrodes 162. The change causes distribution of a refractive index n to occur as shown in FIG. 15, and an incoming light beam can be refracted.

As the optical-axis changing unit, the same effect can be obtained by using the liquid-crystal deflecting optical element, but also by rotating a non-parallel plate or by using a galvano mirror.

As explained above, according to the second embodiment, the liquid-crystal deflecting optical element is used as the optical-axis changing unit for the laser light-source unit, and the tilt of the optical axis of the laser beam can be corrected with a very simple configuration.

An optical scanning device according to a third embodiment is explained in detail below. The third embodiment is different from the first embodiment in that an element to correct a posture of an anamorphic lens is arranged in the side face of the anamorphic lens so as to be in surface contact with the anamorphic lens. The rest of the components are the same as these of the first embodiment, and the same reference numerals represent the same elements, and thus, explanation is omitted.

In the third embodiment, the adjusting screws 308 are provided in all the anamorphic lenses 122 to 125 including the station as the reference, and the scanning lines of the other stations coincide with each other so that the direction and the amount of the scanning line bending are made coincident with these as the reference upon manufacturing. The tilt adjustment can be performed while keeping this state.

There is a case where when the scanning line bending is to be adjusted, contact area between the adjusting screw 308 and the anamorphic lens 122 is narrow, and these two are in point contact or linear contact (in the optical axis direction) with each other. In this case, if the elastic force of the leaf spring 302 and the pressing force of the adjusting screw 308 are not balanced, M-shaped bending or W-shaped bending due to further deformation upon adjustment becomes higher-order bending such that the M shape and the W shape overlap each other. Therefore, the bending amount cannot be adjusted to a predetermined value, and a displacement of scanning lines between the stations cannot be controlled to a target value.

To solve the problem, a method of further increasing adjustment points can be one countermeasure. However, an inflection point of bending occurs between the increased adjustment points and previously provided adjustment points causes an increased number of adjustment points. In this state, time for adjustment increases, and costs rises due to the increased number of adjustment points. Therefore, the method is not practical.

Figure 16A:
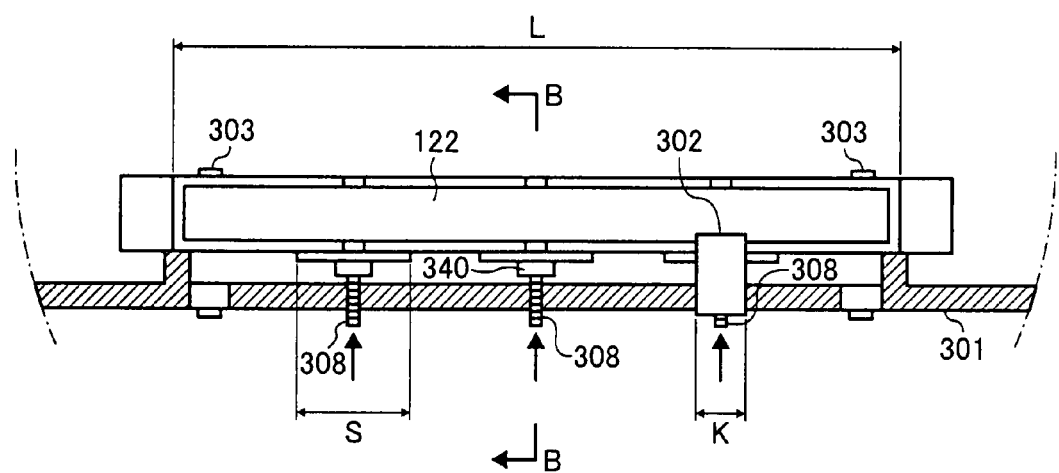
FIG. 16A is a front view of a support structure of an anamorphic lens according to a third embodiment of the present invention.
Figure 16B:
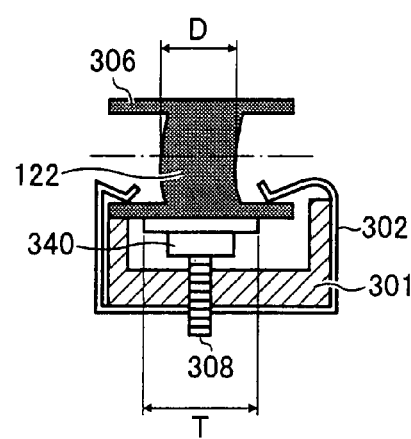
FIG. 16B is a side view taken along line B-B of FIG. 16A.

FIG. 16A is a front view of a support structure of an anamorphic lens according to the third embodiment, and FIG. 16B is a side view taken along line B-B of FIG. 16A. As shown in FIGS. 16A and 16B, a correction-force spreading element 340 as a plate is arranged in the front end of the adjusting screw 308 so that stress is applied to the anamorphic lens 122 in a surface contact manner, and the occurrence of higher-order bending can be suppressed.

In this manner, by pressing the anamorphic lens 122 by the surface of the plate but not by the point or the line, the correction force to the anamorphic lens 122 is spread (dispersed), so that concentration of stress can be avoided. As a result, it is possible to more adequately suppress occurrence of the higher-order bending.

The point to be noted in this case is a relationship between a range where the elastic force is applied by the leaf spring 302 and a range where the pressing force is applied by the adjusting element (adjusting screw 308 and correction-force spreading element 340). If the range of the pressing force of the adjusting element is narrower than the range of the elastic force of the leaf spring 302, local deformation occurs, and the effect of target correction force (pressing force) spreading cannot be obtained. Therefore, it is necessary to set (range of pressing force of the adjusting element)>(range of elastic force of the leaf spring). In FIG. 16A, the leaf spring 302 is exclusively shown in the right-hand side, but it is arranged in all the adjustment points.

If the temperature rises in the image forming apparatus, a difference in the temperature distribution in plastic optical elements and in an element supporting the optical elements occurs in the main scanning direction and the sub-scanning direction even if the temperature is initially adjusted with high precision. This causes occurrence of the warp or change in the warp, and the position of an inflection point of the scanning line bending thereby changes.

Changing the inflection point of the scanning line bending means displacement of an adjustment position, which results in reduction in the effect of correction to the scanning line bending (close to the state before the adjustment). The reduction causes the displacement of the scanning lines between the stations to increase, which leads to image degradation or color misregistration.

However, when the adjusting element is pressed by its surface against the anamorphic lens, as shown in FIGS. 16A and 16B, even if a position of the inflection point of the scanning line bending changes due to the change in the temperature, the position changes within a range of being pressed by the surface. Accordingly, the adjustment effect can be maintained.

The length S of the adjusting screw 308 and the correction-force spreading element 340 in the longitudinal direction (main scanning direction) is set so as to satisfy the following equation (5) where n (n≧1) is the number of positions where the components are attached (number of pressing points), and the effect can be obtained.

The length S of the correction-force spreading element 340 in the longitudinal direction is set longer than the length K of the leaf spring 302 in the longitudinal direction. Accordingly, the pressing force in the longitudinal direction can be spread. The right side of the equation (5) indicates a condition provided so that the adjusting screw 308 and the correction-force spreading element 340 are not in contact with each other and do not interfere with each other.

$$K < S < L/n \tag{5}$$

Where S is a length of a pressing element (the adjusting screw 308 and the correction-force spreading element 340) in the direction corresponding to the longitudinal direction of the pressed optical element (anamorphic lens 122), K is a length of the elastic element (leaf spring 302) in the direction corresponding to the longitudinal direction of the pressed optical element (anamorphic lens 122), and L is a length of the pressed optical element (anamorphic lens 122) in the longitudinal direction.

The change in the temperature in the image forming apparatus causes a difference in expansion or expansion/contraction of materials forming the anamorphic lens 122 and the correction-force spreading element 340 due to a difference of linear expansion coefficients in the materials. In this case, the end face of the correction-force spreading element 340 is caught by the anamorphic lens 122, and therefore free expansion or expansion/contraction is restricted. The catching causes stress to occur, and the stress expands the scanning line bending. To solve the problem, the end face of the correction-force spreading element 340 is subjected to chamfering to eliminate the catching, and also eliminate restriction of free expansion or expansion/contraction.

The same goes for the optical axis direction of the anamorphic lens 122. By making the width of the correction-force spreading element 340 wider than the thickness of the portion against which the anamorphic lens 122 is pressed in the optical axis direction, the restriction of free expansion or expansion/contraction can be eliminated.

The relationship between the two is expressed by equation (6).

$$D < T \tag{6}$$

Where T is a length of a pressing element (the correction-force spreading element 340) in the direction corresponding to the optical axis direction of the pressed optical element (anamorphic lens 122), and D is a thickness of a pressed portion of the pressed optical element (anamorphic lens 122) in the optical axis direction.

In the third embodiment, the change in the position, where the inflection point of the scanning line bending occurs due to the change in temperature, is made ineffective by the correction-force spreading element 340 of which surface is pressed against the anamorphic lens 122. To more reliably change the position within the pressed range, a substantially central position of the correction-force spreading element 340 upon initial adjustment is set as a position where the inflection point of the scanning line bending occurs.

If the correction-force spreading element 340 is softer than the anamorphic lens 122, the elastic force is generated in the correction-force spreading element 340 and adjustment accuracy is deteriorated. Therefore, the correction-force spreading element 340 needs to be formed of a harder material than that of the anamorphic lens 122.

The anamorphic lens 122 is explained so far as a resin-molded lens, but can be a glass-made lens, and the glass-made lens is also adjustable in the same manner as that of the resin-molded lens.

Figure 17:
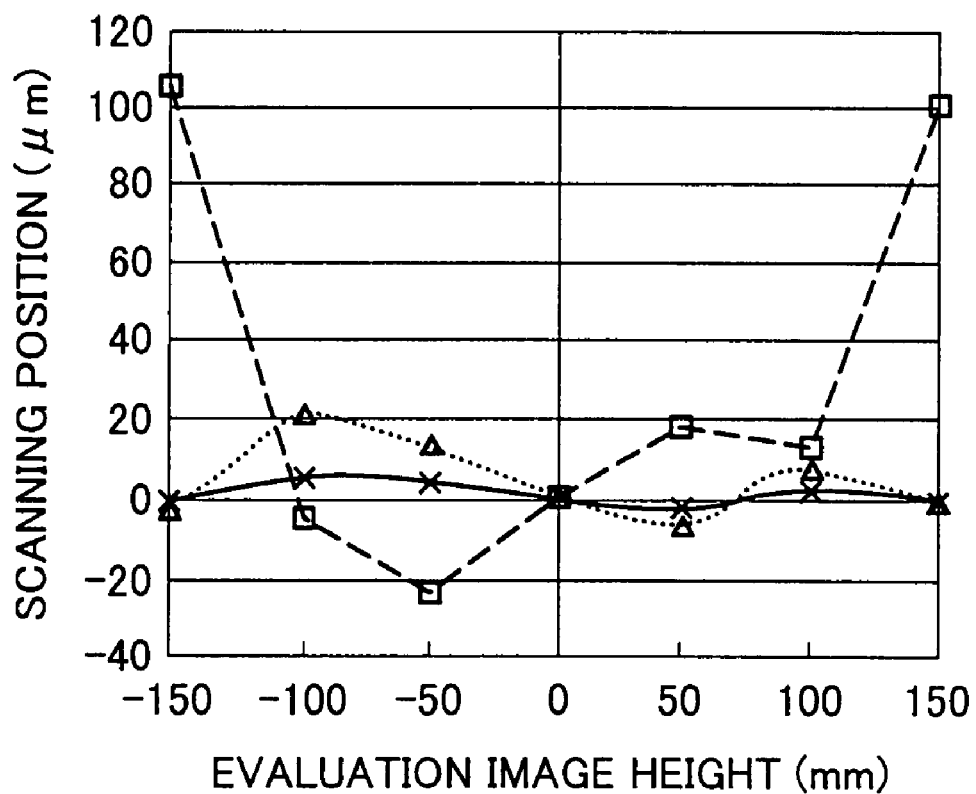
FIG. 17 is a graph representing the result of experiments to verify the pressing adjustment to a long lens according to the third embodiment.

FIG. 17 is a graph representing the result of experiments to verify the pressing adjustment to a long lens according to the third embodiment.

An experiment result related to an adjusting unit (VI) is obtained when the long lens is linearly pressed by a cylindrical pressing element in the optical axis direction. More specifically, the experiment result is obtained when the pressing element is arranged in three locations in total. The three locations are a central part of the long lens and two intermediates between the central part and each of both ends of the lens in the longitudinal direction. A scanning line bending of about 130 micrometers before adjustment was corrected to that of 28 micrometers. However, the corrected value does not satisfy 10 micrometers or less which is a current market demand.

The reason is because scanning positions occur on the opposite sides with respect to a central image height (0 mm), i.e. on the negative side and the positive side of an evaluation image height, and the scanning positions on the negative side and the positive side are reversed through adjustment by the adjusting unit. Eventually, the scanning positions become out of control (adjustment limit).

An experiment result related to an adjusting unit (VII) is obtained when the long lens is adjusted by being pressed by the surface of the correction-force spreading element 340. Even if the scanning position occurs in the opposite direction before the adjustment, the adjustment limit can be lowered because the long lens is pressed by the surface. This enables scanning displacement to be reduced as compared with the case of the adjusting unit (VI), and the scanning line bending can be corrected to 8 micrometers.

More specifically, the experiment results show that the scanning line bending can be corrected by arranging the plane-shaped correction-force spreading element 340 in the central part and the intermediates between the central part and each end of the lens in the longitudinal direction.

As explained above, according to the third embodiment, the resin-molded plastic lens is used to improve the constant speed performance of a laser beam deflected and scanned by the optical scanning device, and the deformation of the posture of the lens due to the fluctuation in the ambient temperature occurring during the use of the lens is appropriately corrected by plane stress. Accordingly, it is possible to perform more stable scanning and exposure in the main scanning direction.

In recent years, an oscillation wavelength of a semiconductor laser (LD) is made shorter to achieve high density, because the diameter of a beam spot on a surface to be scanned is proportional to a wavelength of a light source.

Conventionally, the LD with a wavelength of 780 nanometers (nm) has been widely used, but LD with a wavelength of 500 nanometers or less becomes increasingly used because the shorter wavelength is getting popular. For example, 500 nm/780 nm is 0.64, and thus, it is possible to reduce a diameter of a beam spot to about $2/3$.

The LD with a wavelength of 500 nanometers or less is different in a material from that of the LD with a wavelength of 780 nanometers. The LD with a wavelength of 780 nm is usually made of an Aluminum Gallium Arsenide (AlGaAs) system while the LD with a wavelength of 500 nanometers or less is made of a Gallium Nitride (GaN) system. Therefore, the LD with a wavelength of 500 or less has a heating value greater than that of the LD with a wavelength of 780 nanometers, and this easily causes degradation of a droop characteristic. Thus, it is necessary to reduce the heating value of the LD to realize the shorter wavelength (500 nanometers or less) of the oscillation wavelength of the LD.

To reduce the heating value of the LD, it is required to reduce an oscillation output of the LD. To achieve this, a multibeam light-source unit is needed to be configured by combining a plurality of LDs. In the third embodiment, the semiconductor lasers as two light sources are combined to scan the photosensitive drum using two luminous fluxes. Therefore, the output of the LD has to be a half of the output in the case where one light source is provided.

The number of luminous fluxes for scanning the surface of the photosensitive element can be further increased by a configuration in which a plurality of light sources (LD) as the multibeam light-source unit forms a light source unit, and a plurality of the light source units are combined. This allows improved output speed of the image forming apparatus. Conversely, if the output speed is not changed, it is possible to reduce the rotational speed of the polygon mirror as a deflector, which enables to configure an eco-friendly writing optical system that enables reduction in power consumption and reduction in heating value.

In the embodiments, the example of using the semiconductor laser (LD) as the light source is explained, but the same effect can be obtained by using a semiconductor laser array (LDA) in which a plurality of light emitting points are monolithically arrayed. In this case, divergent luminous fluxes emitted from the light emitting points are coupled by a shared coupling lens, and a plurality of sets each including coupled luminous flux are simply combined to form the light source unit.

Furthermore, a surface-emitting-laser array, in which a plurality of light emitting points as the light source are two-dimensionally arrayed, is used to configure the multibeam light-source unit.

By installing the multibeam light-source unit configured in the above manner, a multibeam optical scanning device can be formed.

Furthermore, the image forming apparatus, an electronic processing unit (i.e., computer), and an image-information communication system (i.e., facsimile) are connected to each other via a network to form an information processing system capable of processing outputs from a plurality of devices with one unit of image forming apparatus.

Moreover, if a plurality of image forming apparatuses are connected to each other over a network, it is possible to learn statuses of the image forming apparatuses, that is, how jobs are processed, whether or not a power is turned on, whether or not there is a failure, or the like, from each output request. Accordingly, it is possible to select an image output device having the best condition (most suitable for user's desire), and to output image information to the selected device.

According to the image forming apparatus including the optical scanning device according to the embodiments, the scanning line bending can be corrected, and high-quality image formation can be performed. Moreover, it is possible to reduce the number of steps of correcting a displacement of a radiation position, the steps such as creation to correction of a misregistration detection pattern, and further creation to correction check of a detection pattern, to be performed as measures against color misregistration or color change occurring during an image formation job. Accordingly, productivity can be improved and the number of times of creating the detection pattern can be reduced, and the number of times of consuming toner by the displacement correcting step can be reduced. Therefore, it is possible to reduce power consumption and suppress the amount of consumption of supplies.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans a surface of a medium in a main scanning direction, the optical scanning device comprising:

a light source that emits a luminous flux;

a deflector that deflects the luminous flux emitted by the light source in a deflection direction toward the surface of the medium;

an optical system that includes an elongated optical element that focuses the luminous flux deflected by the deflector on the surface of the medium;

a pressing member that presses and holds the optical element at n locations, where n is equal to or greater than 1, in a pressing direction orthogonal to the deflection direction; and an elastic member that biases the optical element in a direction opposite to the pressing direction, wherein the pressing member and the elastic member control a posture of the optical element, the pressing member satisfies $K<S<L/n$, where S is a length of the pressing member in the direction corresponding to the longitudinal direction of the pressed optical element, K is a length of the elastic member in the direction corresponding to the longitudinal direction of the pressed optical element, and L is a length of the optical element in the direction corresponding to the longitudinal direction of the pressed optical element, and the pressing member is subjected to chamfering at an end of the pressing member.

2. The optical scanning device according to claim 1, wherein the pressing member is arranged in at least either one of a first location corresponding to an inflection point where a scanning line bending occurs on the medium and a second location between an end of the optical element in the direction corresponding to the longitudinal direction of the pressed optical element and the first location.

3. The optical scanning device according to claim 1, wherein D<T is satisfied, where T is a length of the pressing member in a direction corresponding to an optical axis direction of the optical element and D is a thickness of a pressed portion of the optical element in the optical axis direction.

4. The optical scanning device according to claim 1, wherein the pressing member is made of a harder material than a material of which the optical element is made.

5. The optical scanning device according to claim 1, wherein a wavelength of the light source is 500 nanometers or less.

6. The optical scanning device according to claim 1, wherein the surface of the medium can be simultaneously scanned with a plurality of luminous fluxes.

* * * * *